United States Patent
Kommula et al.

(10) Patent No.: US 9,806,895 B1
(45) Date of Patent: *Oct. 31, 2017

(54) FAST REROUTE OF REDUNDANT MULTICAST STREAMS

(71) Applicant: Juniper Networks, Inc., Sunnyvale, CA (US)

(72) Inventors: Sunanda L. Kommula, Cupertino, CA (US); Alex Baban, San Jose, CA (US); Swamy Sadashivaiah Renu Kananda, Sunnyvale, CA (US); Jamsheed R. Wania, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 128 days.

This patent is subject to a terminal disclaimer.

(21) Appl. No.: 14/675,303

(22) Filed: Mar. 31, 2015

Related U.S. Application Data

(60) Provisional application No. 62/126,296, filed on Feb. 27, 2015.

(51) Int. Cl.
  *H04L 12/28* (2006.01)
  *H04L 12/18* (2006.01)
  (Continued)

(52) U.S. Cl.
  CPC ...... *H04L 12/1863* (2013.01); *H04L 43/0894* (2013.01); *H04L 43/16* (2013.01);
  (Continued)

(58) Field of Classification Search
  CPC . H04L 43/0852; H04L 43/0829; H04L 45/28; H04L 43/16; H04L 45/22;
  (Continued)

(56) References Cited

U.S. PATENT DOCUMENTS 5,485,453 A * 1/1996 Wahlman ............ H04L 49/1523
340/2.23
5,600,642 A 2/1997 Pauwels et al.
(Continued)

FOREIGN PATENT DOCUMENTS

JP  2005130258 A  5/2005
JP  2005167482 A  6/2005
(Continued)

OTHER PUBLICATIONS

Aggarwal et al., "Establishing Point to Multipoint MPLS TE LSPs," IETF, Aug. 2004, 15 pp.
(Continued)

*Primary Examiner* — Sai Aung
(74) *Attorney, Agent, or Firm* — Shumaker & Sieffert, P.A.

(57) ABSTRACT

A system and method for selecting packets to be forwarded from redundant multicast streams. A primary multicast stream and a secondary multicast stream are received, wherein the primary multicast stream and the secondary multicast stream are redundant multicast streams received over disjoint multicast forwarding paths. A hardware-based analyzer in a forwarding plane of the network device is applied to detect when a quality of one of the primary multicast stream or the secondary multicast stream has fallen below a threshold. In response to detecting that a quality of one of the primary multicast stream or the secondary multicast stream has fallen below a threshold, selecting, via a thread executing in a forwarding component of the network device, a different one of the primary multicast stream or the secondary multicast stream having a quality that meets the threshold, wherein selecting includes dynamically rewriting next hop operations associated with the selected stream. Packets received on the selected one of the primary multicast stream or the secondary multicast stream are forwarded (Continued)

and packets of the multicast stream received on the other one of the primary multicast stream or the secondary multicast stream for which the quality has fallen below the threshold are discarded.

35 Claims, 10 Drawing Sheets

(51) Int. Cl.
    *H04L 12/931*     (2013.01)
    *H04L 12/26*     (2006.01)
    *H04L 12/911*     (2013.01)
    *H04L 12/741*     (2013.01)
    *H04L 12/823*     (2013.01)

(52) U.S. Cl.
    CPC .......... *H04L 45/745* (2013.01); *H04L 47/32* (2013.01); *H04L 47/825* (2013.01); *H04L 49/201* (2013.01)

(58) Field of Classification Search
    CPC ..... H04L 47/10; H04L 41/5003; H04L 12/66; H04L 45/304; H04L 41/5009; H04L 45/00; H04L 47/32; H04L 65/80
    See application file for complete search history.

(56) References Cited

U.S. PATENT DOCUMENTS

| | | |
|---|---|---|
| 6,374,303 B1 | 4/2002 | Armitage et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,553,028 B1 | 4/2003 | Tang et al. |
| 6,597,703 B1 | 7/2003 | Li et al. |
| 6,611,528 B1 | 8/2003 | Farinacci et al. |
| 6,625,773 B1 | 9/2003 | Boivie et al. |
| 6,731,652 B2 | 5/2004 | Ramfelt et al. |
| 6,751,218 B1 | 6/2004 | Hagirahim et al. |
| 6,778,531 B1 | 8/2004 | Kodialam et al. |
| 6,807,182 B1 | 10/2004 | Dolphin et al. |
| 6,847,645 B1 | 1/2005 | Potter et al. |
| 6,879,594 B1 | 4/2005 | Lee et al. |
| 6,920,503 B1 | 7/2005 | Nanji et al. |
| 6,928,603 B1 * | 8/2005 | Castagna ............... H03M 13/35 714/786 |
| 6,976,154 B1 | 12/2005 | Dyckerhoff et al. |
| 7,035,226 B2 | 4/2006 | Enoki et al. |
| 7,039,687 B1 | 5/2006 | Jamieson et al. |
| 7,082,102 B1 | 7/2006 | Wright |
| 7,133,928 B2 | 11/2006 | McCanne |
| 7,184,437 B1 | 2/2007 | Cole et al. |
| 7,251,218 B2 | 7/2007 | Jorgensen |
| 7,269,135 B2 | 9/2007 | Frick et al. |
| 7,281,058 B1 | 10/2007 | Shepherd et al. |
| 7,289,505 B2 | 10/2007 | Sanchez et al. |
| 7,304,955 B2 | 12/2007 | Lee |
| 7,330,468 B1 | 2/2008 | Tse-Au |
| 7,333,491 B2 | 2/2008 | Chen et al. |
| 7,359,328 B1 | 4/2008 | Allan |
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,463,591 B1 | 12/2008 | Kompella et al. |
| 7,477,642 B2 | 1/2009 | Aggarwal et al. |
| 7,483,439 B2 | 1/2009 | Shepherd et al. |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,532,624 B2 | 5/2009 | Ikegami et al. |
| 7,545,735 B1 | 6/2009 | Shabtay et al. |
| 7,558,199 B1 | 7/2009 | Minei et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,567,512 B1 | 7/2009 | Minei et al. |
| 7,570,604 B1 | 8/2009 | Aggarwal et al. |
| 7,570,605 B1 | 8/2009 | Aggarwal et al. |
| 7,590,115 B1 | 9/2009 | Aggarwal et al. |
| 7,602,702 B1 * | 10/2009 | Aggarwal ............... H04L 45/00 370/217 |
| 7,606,235 B1 | 10/2009 | Ayyangar et al. |
| 7,742,482 B1 | 6/2010 | Aggarwal |
| 7,787,380 B1 | 8/2010 | Aggarwal et al. |
| 7,826,348 B2 | 11/2010 | Farinacci et al. |
| 7,830,787 B1 | 11/2010 | Wijnands et al. |
| 7,839,862 B1 | 11/2010 | Aggarwal |
| 7,860,104 B1 | 12/2010 | Aggarwal |
| 7,933,267 B1 | 4/2011 | Aggarwal et al. |
| 7,936,780 B1 | 5/2011 | Kompella |
| 7,940,698 B1 | 5/2011 | Minei |
| 7,957,386 B1 | 6/2011 | Aggarwal et al. |
| 7,983,261 B1 | 7/2011 | Aggarwal et al. |
| 7,990,963 B1 | 8/2011 | Aggarwal et al. |
| 7,990,965 B1 | 8/2011 | Aggarwal et al. |
| 8,014,317 B1 | 9/2011 | Ghosh et al. |
| 8,050,559 B2 | 11/2011 | Sindhu |
| 8,068,492 B1 | 11/2011 | Aggarwal et al. |
| 8,077,726 B1 | 12/2011 | Kumar et al. |
| 8,121,056 B1 | 2/2012 | Aggarwal et al. |
| 8,125,926 B1 | 2/2012 | Kompella |
| 8,160,076 B1 | 4/2012 | Aggarwal et al. |
| 8,259,564 B1 | 9/2012 | Gredler et al. |
| 8,462,635 B1 | 6/2013 | Aggarwal et al. |
| 8,488,614 B1 | 7/2013 | Aggarwal |
| 8,767,741 B1 | 7/2014 | Aggarwal |
| 8,837,479 B1 * | 9/2014 | Kumar ............... H04L 12/1877 370/228 |
| 8,917,729 B1 | 12/2014 | Kumar et al. |
| 2002/0071390 A1 | 6/2002 | Reeves et al. |
| 2002/0109879 A1 | 8/2002 | Wing So |
| 2002/0118644 A1 | 8/2002 | Moir |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2003/0012215 A1 | 1/2003 | Novaes |
| 2003/0021282 A1 | 1/2003 | Hospodor |
| 2003/0031175 A1 | 2/2003 | Hayashi et al. |
| 2003/0043772 A1 | 3/2003 | Mathis et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0099218 A1 | 5/2003 | Tillotson |
| 2003/0099235 A1 | 5/2003 | Shin et al. |
| 2003/0108047 A1 | 6/2003 | Mackiewich et al. |
| 2003/0112748 A1 | 6/2003 | Puppa et al. |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0210705 A1 | 11/2003 | Seddigh et al. |
| 2003/0223402 A1 | 12/2003 | Sanchez et al. |
| 2004/0037279 A1 | 2/2004 | Zelig et al. |
| 2004/0042406 A1 | 3/2004 | Wu et al. |
| 2004/0047342 A1 | 3/2004 | Gavish et al. |
| 2004/0081154 A1 | 4/2004 | Kouvelas |
| 2004/0151180 A1 | 8/2004 | Hu et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0190542 A1 | 9/2004 | Ono et al. |
| 2004/0213160 A1 | 10/2004 | Regan et al. |
| 2004/0218536 A1 | 11/2004 | Yasukawa et al. |
| 2004/0240446 A1 | 12/2004 | Compton et al. |
| 2005/0001720 A1 | 1/2005 | Mason et al. |
| 2005/0013295 A1 | 1/2005 | Regan et al. |
| 2005/0018693 A1 | 1/2005 | Dull |
| 2005/0025156 A1 | 2/2005 | Smathers |
| 2005/0027782 A1 | 2/2005 | Jalan et al. |
| 2005/0097203 A1 | 5/2005 | Unbehagen et al. |
| 2005/0108419 A1 | 5/2005 | Eubanks |
| 2005/0111351 A1 | 5/2005 | Shen |

(56) References Cited

U.S. PATENT DOCUMENTS

| | | |
|---|---|---|
| 2005/0129001 A1 | 6/2005 | Backman et al. |
| 2005/0169270 A1 | 8/2005 | Mutou et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0047851 A1 | 3/2006 | Voit et al. |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2007/0036162 A1 | 2/2007 | Tingle et al. |
| 2007/0076709 A1 | 4/2007 | Mattson et al. |
| 2007/0098003 A1 | 5/2007 | Boers et al. |
| 2007/0104119 A1 | 5/2007 | Sarkar et al. |
| 2007/0124454 A1 | 5/2007 | Watkinson |
| 2007/0140107 A1 | 6/2007 | Eckert et al. |
| 2008/0044181 A1 | 2/2008 | Sindhu |
| 2008/0056258 A1 | 3/2008 | Sharma et al. |
| 2008/0123524 A1 | 5/2008 | Vasseur et al. |
| 2008/0123654 A1 | 5/2008 | Tse-Au |
| 2008/0267078 A1 | 10/2008 | Farinacci et al. |
| 2008/0291921 A1 | 11/2008 | Du et al. |
| 2009/0028149 A1 | 1/2009 | Yasukawa et al. |
| 2009/0201803 A1 | 8/2009 | Filsfils et al. |
| 2009/0245248 A1 | 10/2009 | Arberg et al. |
| 2010/0296517 A1 | 11/2010 | Kompella |
| 2014/0029447 A1* | 1/2014 | Schrum, Jr. ............ H04L 45/66 370/252 |

FOREIGN PATENT DOCUMENTS

| | | |
|---|---|---|
| JP | 2005252385 A | 9/2005 |
| KR | 2004001206 | 1/2004 |
| WO | 02091670 A2 | 11/2002 |
| WO | 2004071032 A1 | 8/2004 |

OTHER PUBLICATIONS

Aggarwal et al., "MPLS Upstream Label Assignment and Context Specific Label Space," Network Working Group Internet Draft, draft-raggarwa-mpls-upstream-label- 00.txt, Jan. 2005, 9 pp.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pp.

Atlas et al., "MPLS RSVP-TE Interoperability for Local Protection/Fast Reroute," IETF, Jul. 2001, 14 pp.

Karan, "Multicast Only Fast Re-Route," Internet-Draft, draft-karan-mofrr-01, IETF Trust, Mar. 9, 2011, 15 pp.

Awduche et al., RFC 3209, "RSVP-TE: Extensions to RSVP for LSP Tunnels," Network Working Group, Dec. 2001, 57 pp.

Deering et al., "Protocol Independent Multicast-Sparse Mode (PIM-SM): Motivation and Architecture," draft-ietf-idmr-pim-arch-05.txt, Network Working Group, Aug. 4, 1998, 25 pp.

ISO/IEC 10589, International Standard, "Information technology—Telecommunications and information exchange between systems—Intermediate System to Intermediate System intra-domain routeing information exchange protocol for use in conjunction with the protocol for providing the connectionless-mode network service (ISO 8473)," Second Edition Nov. 15, 2002, 210 pp.

Karan et al., "Multicast only Fast Re-Route", draft-karan-mofrr-01, Mar. 13, 2011, Network Working Group, Internet Draft, 14 pp.

Katz, et al., "Bidirectional Forwarding Detection (BFD)," Internet Engineering Task Force (IETF), RFC 5880, Jun. 2010, 49 pp.

Kompella, et al., "Multi-homing in BGP-based Virtual Private LAN Service," draft-kompella-l2vpn-vpls-multihoming-02.txt, Network Working Group, Internet-Draft, Nov. 3, 2008, 27 pp.

Kompella, et al., "Virtual Private Lan Service (VPLS) Using BGP for Auto-Discovery and Signaling," Network Working Group, RFC 4761, Jan. 2007, 28 pp.

Le Roux et al., "Fast Reroute in MPLS L3VPN networks Towards CE-to-CE Protection," www.mpls2006.com, 2006, 24 pp.

Lindem, et al., "OSPFv3 LSA Extendibility," draft-ietf-ospf-ospfv3-lsa-extend-06.txt, Network Working Group, Internet-Draft, Feb. 16, 2015, 33 pp.

Martini et al., "Encapsulation Methods for Transport of Layer 2 Frames Over IP and MPLS Networks," Network Working Group Internet Draft, draft-martini-l2circuit-encap- mpls-04.txt, Nov. 2001, 17 pp.

Martini et al., "Transport of Layer 2 Frames Over MPLS," Network Working Group Internet Draft, draft-martini-l2circuit-trans-mpls-08.txt, Nov. 2001, 18 pp.

Moy, "OSPF Version 2," Network Working Group, Request for Comments: 2328, Apr. 1998, 194 pp.

Pan et al., "Fast Reroute Extensions to RSVP-TE for LSP Tunnels," RFC 4090, May 2005, 36 pp.

Psenak, et al., "OSPFv2 Prefix/Link Attribute Advertisement," draft-ietf-ospf-prefix-link-attr-00.txt, Network Working Group, Internet Draft, Aug. 12, 2014, 13 pp.

Rosen et al., "Multicast in MPLS/BGP IP VPNs," draft-rosen-vpn-mcast-07.txt, May 2004, 27 pp.

RSVP-TE: Resource Reservation Protocol—Traffic Extension, Javvin Company, printed Apr. 18, 2005, http://www.javvin.com/protocolRSVPTE.html, 2 pp.

Satyanarayana et al., "Extensions to GMPLS RSVP Graceful Restart", draft-aruns-ccamp-restart-ext-01.txt, Jul. 2004, Network Working Group Internet Draft, 23 pp.

U.S Appl. No. 12/574,428, by Rahul Aggarwal, filed Oct. 6, 2009.

U.S. Appl. No. 14/666,151, by Shraddha Hegde, filed Mar. 23, 2015.

Vasseur, et al., "Definition of an IS-IS Link Attribute Sub-TLV," Network Working Group, RFC 5029, Sep. 2007, 6 pp.

Wijnands et al., "Multicast Extensions for LDP," Network Working Group Internet Draft, draft-wijnands-mpls-ldp-mcast-ext-00.txt, Mar. 2005, 13 pp.

Yasukawa et al., "Requirements for Point to Multipoint extension to RSVP-TE," IETF, Oct. 2003, 20 pp.

Zhang, "A Destination-initiated Multicast Routing Protocol for Shortest Path Tree Constructions," GLOBECOM Dec. 2003, IEEE Global Telecommunications Conference, XP010677629, pp. 2840-2844.

* cited by examiner

FAST REROUTE OF REDUNDANT MULTICAST STREAMS

This application claims priority from U.S. Provisional Application Ser. No. 62/126,296, filed Feb. 27, 2015, the entire content of which is incorporated herein by reference.

TECHNICAL FIELD

The disclosure relates to packet-based computer networks and, more particularly, to forwarding multicast packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

In some instances, these packets may be directed to a single destination device in a type of communication referred to as a "unicast" communication. Many applications make use of unicast communications, such as web browsers that communicate via the HyperText Transfer Protocol (HTTP). Unicast communications (or "unicasting"), however, may not be appropriate for all applications, especially those that deliver substantially the same content at substantially the same time to a plurality of destination devices, such as Internet Protocol Television (IPTV), web-conferencing, video conferencing, and other multi-user applications. For these multi-user applications, the use of unicast communications would require delivery of the same content multiple times, i.e., a separate transmission for each destination device, which would unnecessarily consume network bandwidth and strain server resources. As a result, a form of communication referred to as "multicast" communication or "multicasting" was developed to address this unnecessary consumption of network resources.

Multicasting may involve using network devices to replicate data packets for receipt by multiple recipients and thereby reduce the transmission burden on the sender, leading to scalability and more efficient packet delivery. A sender of multicast communication transmits multicast packets to a single address, the multicast group address. Recipients may request to "join" the multicast group in accordance with a protocol, such as the Internet Group Management Protocol (IGMP). If the request is granted, packets sent to the group address are replicated by the network devices of the network and forwarded to the address of the joined recipient, along with all other previously joined recipients.

Multicast live-live techniques allow routers to use multicast techniques, such as join requests, to set up multiple redundant multicast streams across a network to improve robustness of content delivery in case of failures in the network. A receiving router receives multicast data packets on both a primary multicast forwarding path and a secondary multicast forwarding path. The receiving router forwards a primary one of the redundant multicast streams to the next-hop router, while dropping packets of a secondary one of the redundant multicast streams.

SUMMARY

In general, techniques are described for reducing a delay experienced when a router switches from forwarding a primary multicast stream to forwarding a redundant secondary multicast stream. That is, the techniques described herein enable a router to detect, in forwarding plane hardware, a need to switch from forwarding the primary multicast stream to forwarding a redundant secondary multicast stream. The techniques also enable the router to efficiently update forwarding information base (FIB) entries to effectively switch to forwarding the secondary multicast stream rather than the primary multicast stream. Providing these detection and switchover functions in forwarding plane hardware of the router allow for a fast switch between forwarding the primary multicast stream to forwarding the redundant secondary multicast stream.

According to one aspect, a primary multicast stream and a secondary multicast stream are received, wherein the primary multicast stream and the secondary multicast stream are redundant multicast streams received over disjoint multicast forwarding paths. A hardware-based analyzer in a forwarding plane of the network device is applied to detect when a quality of one of the primary multicast stream or the secondary multicast stream has fallen below a threshold. In response to detecting that a quality of one of the primary multicast stream or the secondary multicast stream has fallen below a threshold, selecting, via a thread executing in a forwarding component of the network device, a different one of the primary multicast stream or the secondary multicast stream having a quality that meets the threshold, wherein selecting includes dynamically rewriting next hop operations associated with the selected stream. Packets received on the selected one of the primary multicast stream or the secondary multicast stream are forwarded and packets of the multicast stream received on the other one of the primary multicast stream or the secondary multicast stream for which the quality has fallen below the threshold are discarded.

According to another aspect, a routing device includes a forwarding component. The forwarding component includes a packet-forwarding integrated circuit, a memory to store a hardware version of a forwarding information base (FIB), and a processor. The packet-forwarding integrated circuit comprises a control logic module and an inline fast re-route table, wherein the inline fast re-route table maintains status associated with each of a plurality of redundant multicast data streams, wherein the status is used to select a redundant multicast data stream from the plurality of redundant multicast data streams to forward to a next routing device and to discard any remaining streams. The hardware version of the FIB includes a plurality of entries addressable by the packet-forwarding integrated circuit, wherein each of the entries is associated with different packet header key data, and identifies one or more forwarding next hops for forwarding data packets matching the respective entry, and wherein each entry identifies an incoming interface for a multicast data stream. And the processor automatically rewrites next hop operations to forward a different redundant multicast data stream to the next routing device in response to detecting that a quality of one of the redundant multicast data streams has fallen below the quality threshold.

According to another aspect, a non-volatile computer-readable storage medium comprises instructions for causing a programmable processor to receive a primary multicast stream and a secondary multicast stream, wherein the primary multicast stream and the secondary multicast stream are redundant multicast streams received over disjoint multicast forwarding paths, apply a hardware-based analyzer in a forwarding plane of the network device to detect when a quality of one of the primary multicast stream or the secondary multicast stream has fallen below a threshold, select, in response to detecting that a quality of one of the primary multicast stream or the secondary multicast stream has fallen below a threshold and via a thread executing in a forwarding component of the network device, a different one of the primary multicast stream or the secondary multicast stream having a quality that meets the threshold, wherein selecting includes dynamically rewriting next hop operations associated with the selected stream, forward packets received on the selected one of the primary multicast stream or the secondary multicast stream and discard packets of the multicast stream received on the other one of the primary multicast stream or the secondary multicast stream for which the quality has fallen below the threshold.

According to another aspect, a packet-forwarding integrated circuit comprises a hardware-based analyzer to detect when a quality of one of a primary multicast stream and a secondary multicast stream has fallen below a threshold, wherein the primary multicast stream and the secondary multicast stream are redundant multicast streams received over disjoint multicast forwarding paths and means for selecting, when a quality of one of the primary multicast stream or the secondary multicast stream has fallen below a threshold, a different one of the primary multicast stream or the secondary multicast stream having a quality that meets the threshold, wherein selecting comprises dynamically rewriting next hop operations associated with the selected stream. Wherein the packet-forwarding integrated circuit forwards packets received on the selected one of the primary multicast stream or the secondary multicast stream, and discards packets of the multicast stream received on the other one of the primary multicast stream or the secondary multicast stream for which the quality has fallen below the threshold.

In yet another aspect, a routing device comprises one or more interfaces to receive a primary multicast stream and a secondary multicast stream, wherein the primary multicast stream and the secondary multicast stream are redundant multicast streams received over disjoint multicast forwarding paths and a forwarding component connected to the one or more interfaces. The forwarding component comprises a general-purpose processor and a packet-forwarding integrated circuit comprising a hardware-based analyzer to detect when a quality of one of the primary multicast stream or the secondary multicast stream has fallen below a threshold. A thread executing in the general-purpose processor detects that a quality of one of the primary multicast stream or the secondary multicast stream has fallen below a threshold and selects a different one of the primary multicast stream or the secondary multicast stream having a quality that meets the threshold, wherein selecting includes dynamically rewriting next hop operations associated with the selected stream. The packet-forwarding integrated circuit forwards packets received on the selected one of the primary multicast stream or the secondary multicast stream, and discards packets of the multicast stream received on other ones of the primary multicast stream or the secondary multicast stream.

The details of one or more aspects of this disclosure are set forth in the accompanying drawings and the description below. Other features, objects, and advantages will be apparent from the description and drawings, and from the claims.

DETAILED DESCRIPTION

Figure 1:
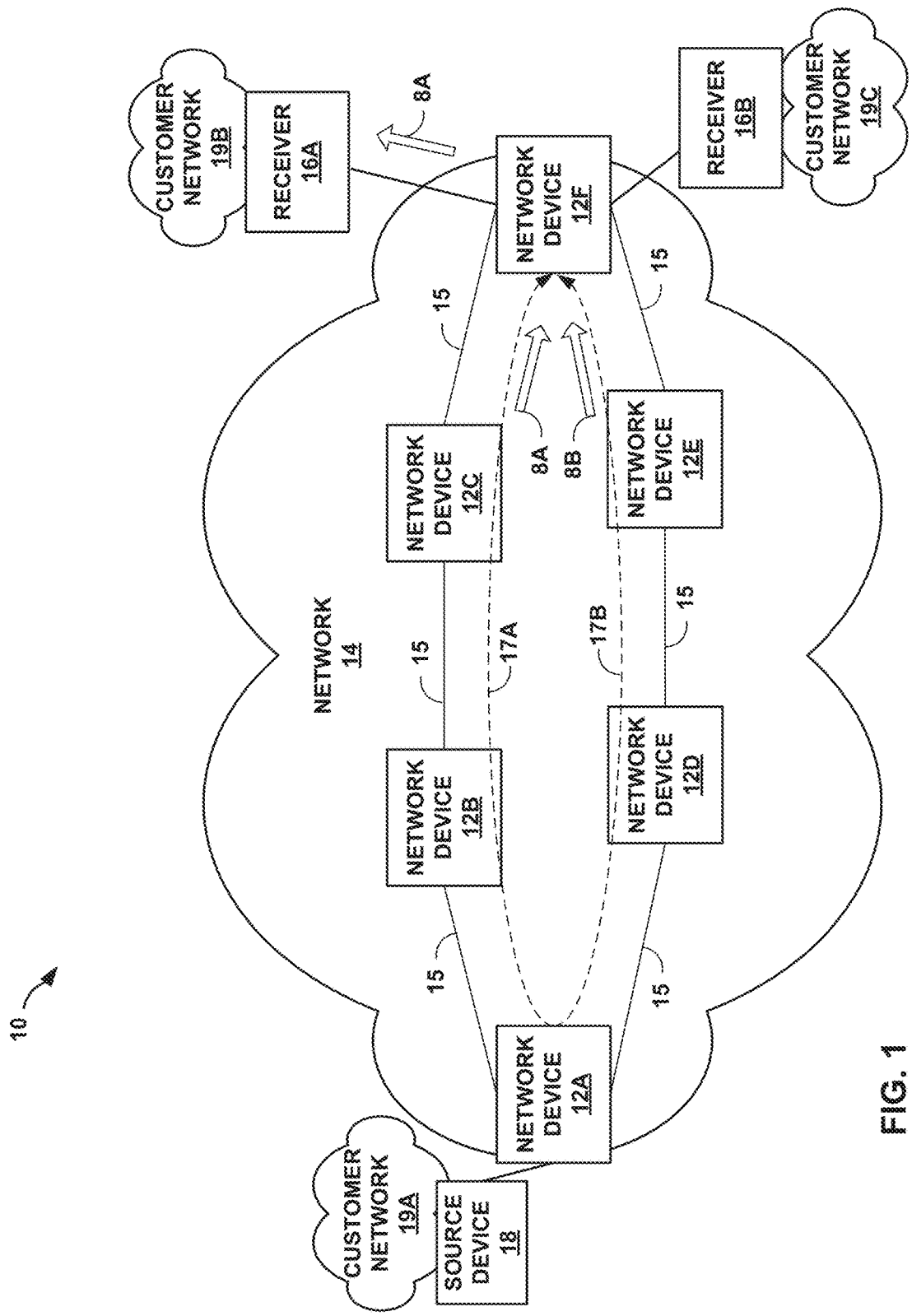
FIG. 1 is a block diagram illustrating an example system in which network devices are configured to forward network traffic in accordance with the techniques described in this disclosure.

FIG. 1 is a block diagram illustrating an example system 10 in which network devices 12A-12F ("network devices 12") of network 14 are configured to forward network traffic (e.g., network packets) in accordance with the techniques described in this disclosure. In the illustrated example of FIG. 1, network devices 12A and 12F may be edge routers of network 14, which may be administered by a network service provider, and provide connectivity for customer networks 19A-19C ("customer networks 19"). Edge routers 12A and 12F may be coupled to customer edge (CE) routers (not shown) of customer networks 19 via access links. Edge routers 12A and 12F communicate with CE routers to provide source device 18 and receiver devices 16A-16B of customer networks 19 with access to network 14.

As shown, each of customer networks 19 may be a network for a site of an enterprise. Each of customer networks 19 may include one or more computing devices (not shown) in addition to source device 18 and receiver devices 16A-16B, which may be, for example, personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Consequently, customer networks 19 may be viewed as edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like and may be connected to other networks.

In this example, network devices 12A-12F are connected to one another by physical links 15. The physical links 15 may be a physical medium, such as a copper wire, a coaxial cable, any of a host of different fiber optic lines, or a wireless connection. Network 14 may be traffic-engineered to include multiple multicast forwarding paths 17A-17B ("multicast forwarding paths 17") for controlling the flow of traffic through network 14. For example, a primary multicast forwarding path 17A and a secondary multicast forwarding path 17B are established between network device 12A and network device 12F, where primary multicast forwarding path 17A and secondary multicast forwarding path 17B are disjoint paths through network 14 (i.e., do not traverse common nodes or links). For example, routers 12 may use a multicast protocol such as Protocol Independent Multicast (PIM), or multicast source discovery protocol (MSDP) to output multicast join requests along two or more disjoint multicast forwarding paths toward network device 12A to establish a plurality of multicast forwarding paths, including primary multicast forwarding path 17A and secondary multicast forwarding path 17B (FIG. 1). As another example, routers 12 may use multicast label distribution protocol (mLDP) to establish the multicast forwarding paths 17. In some examples, formation of multicast forwarding paths 17 is initiated by network device 12F, or by network device 12A.

Network device 12A may receive a single multicast stream from source device 18, and may output redundant copies of the multicast stream as primary multicast stream 8A over primary multicast forwarding path 17A, and secondary multicast stream 8B over secondary multicast forwarding path 17B. Network device 12F receives a primary multicast stream 8A over primary multicast forwarding path 17A, and receives a secondary multicast stream 8B over secondary multicast forwarding path 17B. Primary multicast stream 8A and secondary multicast stream 8B are redundant multicast streams, i.e., include identical content. For example, multicast streams 8A-8B may include video content from source device 18 requested by receiver 16A of customer network 19B. In some examples, there may be more than two redundant multicast streams flowing along disjoint paths from network device 12A to network device 12B.

In the example of FIG. 1, network device 12F may operate as a topology merge point for delivering one of the redundant multicast streams 8A-8B to receivers 16A and/or 16B. In one example, network device 12F uses PIM join/prune messages to set up primary multicast forwarding path 17A and secondary multicast forwarding path 17B by establishing a primary and secondary reverse path forwarding (RPF) interface on each network device 12 that receives a PIM join. An example operation of a topology merge point is described in Multicast Only Fast Re-route are described in A. Karan, "Multicast Only Fast Re-Route," Internet-Draft, draft-karan-mofrr-01, March 2011, the entire contents of which are incorporated by reference herein. Network 14 may be considered a topology with a primary plane and a secondary plane that are fully disjoint from each other. Such a dual-planed topology may in some cases be referred to as "multicast live-live."

In the example of FIG. 1, multicast fast reroute techniques allow network device 12F to receive multiple redundant multicast streams from a source, and forward only a primary one of the redundant multicast streams to the next-hop device, e.g., receiver 16A, while dropping packets of any remaining redundant multicast streams. When a multicast packet enters an interface of one of network devices 12, such as network device 12F, network device 12F determines whether the source IP address is consistent with networks that are known to be reachable via that input interface, i.e., network device 12F checks the reverse path of the packet (does an "RPF check"). If network device 12F finds a matching routing entry for the source IP of the multicast packet, the RPF check passes and network device 12F forwards the packet to all outgoing interfaces that are participating in multicast for this multicast group. If the RPF check fails, network device 12F drops the packet. RPF checks allow network device 12F to forward only packets that are received on an interface that is associated with the routing entry for the source of the packet, thus breaking any data loop that may exist. In the example shown in FIG. 1, network device 12F receives data packets from the primary and secondary forwarding paths 17. Network device 12F does an RPF check on the received data packets, and forwards packets received on the primary RPF interface that pass the RPF check, and discards redundant packets received on the secondary RPF interface due to an RPF check failure.

In some examples, network device 12F utilizes a hardware-based scheme to monitor rates of packets received over the incoming interfaces, as described below, and may detect degradation of a quality of the primary stream by detecting that a rate of packets received over primary multicast forwarding path 17A has dropped below a threshold packet rate. When network device 12F detects degradation below a quality threshold on the primary multicast forwarding path, a forwarding plane of network device 12F triggers a fast reroute repair in the forwarding plane to automatically select and forward the secondary redundant multicast stream to the next-hop router, and discard packets of the primary redundant multicast stream. In some cases, none of the links 15 that are coupled directly to network device 12F have failed, but a failure or merely congestion may have occurred somewhere upstream of network device 12F along one of multicast forwarding paths 17. Even though a failure of a directly coupled link has not occurred, network device 12F can nonetheless trigger a switch from to forwarding primary multicast stream 8A to forwarding secondary multicast stream 8B when, for example, network device 12F detects that a rate of packets received over primary multicast forwarding path 17A has dropped below a threshold packet rate.

In accordance with the techniques described herein, network device 12F may store forwarding information in which entries for multicast routes are each represented as pointers to RPF lists of alternate RPF interfaces for performing RPF checks. The routes may also point to outgoing interface (OIF) lists of one or more OIFs for next-hops to which to forward network packets matching the multicast routes. Specifically, network device 12F may include one or more forwarding components, e.g., packet-forwarding engines, having packet-forwarding ICs for high-speed switching and forwarding of network packets based on keying information extracted from headers of the packets. The keying information may include, for example, a multicast source address, an MPLS label stack, destination addresses, or other such information. A control-plane of network device 12F maintains routing information to reflect the topology of network 14, processes the routing information to select routes to the various destinations, and generates a forwarding information base (FIB), such as a database or series of tables or other data structures, that maps packet keying information to RPF interfaces, and next-hops and corresponding output interfaces of the router. The control plane of network device 12F configures the forwarding ASIC of its packet-forwarding engine by programming the ASICs with a hardware-based copy of the FIB.

In some examples, network device 12F programs a hardware-based copy of the FIB into an application-specific integrated circuit (ASIC) of a forwarding component of the router. In accordance with the techniques of this disclosure, entries of the hardware FIB for multicast routes may internally point to an RPF list that includes at least a primary RPF interface and a secondary RPF interface as elements of the RPF list for that entry. In general, the primary RPF interface is the incoming interface on which primary multicast stream 8A is received, and the secondary RPF interface is the incoming interface on which secondary multicast stream 8B is received. Example techniques performing a fast re-route are described by U.S. Pat. No. 8,077,726, entitled "Fast Reroute for Multiple Label Switched Paths Sharing a Single Interface," issued Dec. 13, 2011, the entire contents of which are incorporated by reference herein.

For example, entries of the hardware-based FIB within the ASICs may be configured to include a pointer to a data structure defining the RPF list, where the data structure specifies (1) an incoming interface (IIF) for the primary RPF interface and OIF list of outgoing interface(s) to which to send the packet stream, and (2) an incoming interface for the secondary RPF interface and a corresponding OIF list of outgoing interface(s) to which to send the packet stream. The OIF lists associated with the different elements may be the same. The IIFs and the OIFs may be logical interfaces that may or may not map to a physical interface, such as a physical interface port.

Network device 12F may be configured with one or more analyzers, each associated with a different incoming logical interface on which an inbound packet stream is received. In some examples, the analyzers are logical constructs that can be dynamically programmed into a portion of ASICs of a forwarding plane of network device 12F, and may be programmed with an associated rate. The analyzers analyze the quality of incoming streams relative to the programmed rate, and may record the quality of incoming streams to an inline FRR table. In some examples, the analyzers receive a bit count maintained for each incoming stream and calculate a bit rate over discrete periods of time for each stream. In some examples, if the stream bit rate falls below a predetermined rate threshold, the stream is demoted to "bad" quality. In other examples, the analyzers compare a received byte count for each stream to an expected byte count for that stream. In some examples, if the received byte count for a stream falls below the expected byte count, the stream is demoted to "bad" quality.

A hardware thread monitors the status or health of incoming redundant multicast streams, such as by inspecting the inline FRR table, and programs the ASIC to forward the appropriate streams. If more than one of a plurality of redundant multicast streams is above a configured threshold, in some example approaches, the hardware thread may be configured to default to selecting the primary multicast stream to forward rather than the redundant streams.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1. As another example, network device 12F may receive a greater number of redundant multicast streams than shown in FIG. 1.

Although described for purposes of example in terms of multicast fast reroute, the techniques of this disclosure may be used in other situations. For example, the techniques described herein for fast switchover between primary and secondary redundant data streams may be applied in contexts other than multicast, such as redundant unicast streams, including where unicast RPF methods are used.

Also, although described for purposes of example in terms of streams, the techniques of this disclosure may be used for fast switchover between, for instance, primary and secondary Multicast VPN (MVPN) tunnels as will be detailed below.

Figure 2:
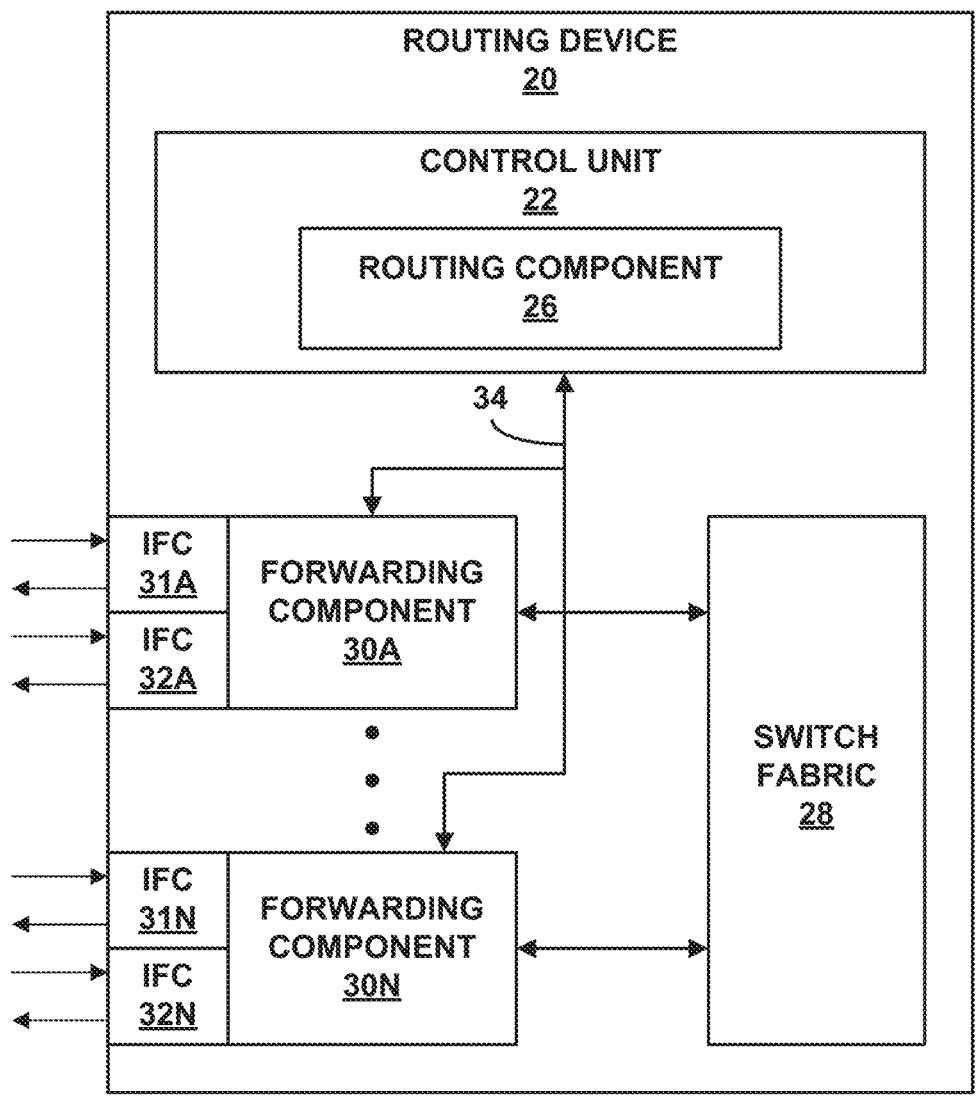
FIG. 2 is a block diagram illustrating an example embodiment of a routing device consistent with the techniques described in this disclosure.

FIG. 2 is a block diagram illustrating an example routing device 20 that creates forwarding structures to be installed in a forwarding plane of routing device 20 in accordance with the principles described herein. Routing device 20 may comprise a router such as one of network devices 12 of FIG. 1, a core router, or other network device. In this example, routing device 20 includes a control unit 22 that includes a routing component 26 that provides control plane functionality for routing device 20. Routing device 20 also includes a plurality of forwarding components 30A-30N ("forwarding components 30") and a switch fabric 28 that collectively provide a data plane for forwarding network traffic. Forwarding components 30 receive and send data packets via interface cards 31A-31N ("IFCs 31") and IFCs 32A-32N ("IFCs 32"). IFCs 31 are physical interface cards. In other embodiments, each of forwarding components 30 may comprise more or fewer IFCs. Although not shown, forwarding components 30 may each comprise a central processing unit (CPU) and a memory. Switch fabric 28 provides a high-speed interconnect for forwarding incoming data packets to the correct one of forwarding components 30 for transmission over a network. U.S. Pat. No. 8,050,559, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

Routing component 26 provides control plane functions for storing network topology in the form of routing tables or other structures, executing routing protocols to communicate with peer routing devices and maintain and update the routing tables, and providing a management interface to allow user access and configuration of routing device 20. Control unit 22 provides an operating environment for routing component 26 and may be implemented solely in software, or hardware, or may be implemented as a combination of software, hardware or firmware. For example, control unit 22 may include one or more processors which execute software instructions. In that case, routing component 26 may include various software modules or daemons (e.g., one or more routing protocol processes, user interfaces and the like), and control unit 22 may include a computer-readable storage medium, such as computer memory or hard disk, for storing executable instructions.

In some examples, routing component 26 is connected to each of forwarding components 30 by a dedicated internal communication link 34. For example, dedicated link 34 may comprise a 200 Mbps Ethernet connection. Routing component 26 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interfaces (e.g., physical interface ports) of IFCs 31, 32. Routing component 26 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing component 26 communicates data representative of a software copy of the FIB into each of forwarding components 30 to control forwarding of traffic within the data plane. This allows the software FIB stored in memory (e.g., RAM) of in each of forwarding components 30 to be updated without degrading packet-forwarding performance of routing device 20. In some instances, routing component 26 may derive separate and different software FIBs for each respective forwarding components 30. In addition, one or more of forwarding components 30 include application-specific integrated circuits (ASICs) (not shown) that forwarding components 30 program with a hardware-copy of the FIB based on the software FIBs (i.e., hardware versions of the software FIBs) copied to each respective forwarding component 30.

As described herein, the hardware FIBs within the forwarding ASICs are dynamically programmed by a microprocessor on forwarding components 30 to include entries that each include a pointer to internal structures within the ASICs, where each of those structures are programmed to store multicast fast reroute data that specifies (1) an RPF list having at least (a) an incoming interface associated with a primary multicast forwarding path, and (b) an incoming interface associated with a secondary multicast forwarding path, and (2) a list of one or more forwarding next hops to which to forward packets matching the entry of the FIB, e.g., an outgoing interface (OIF) list. The RPF list may include more than two incoming interfaces. For example, there may be more than two redundant multicast data streams, each being received on a different incoming interface.

Figure 3:
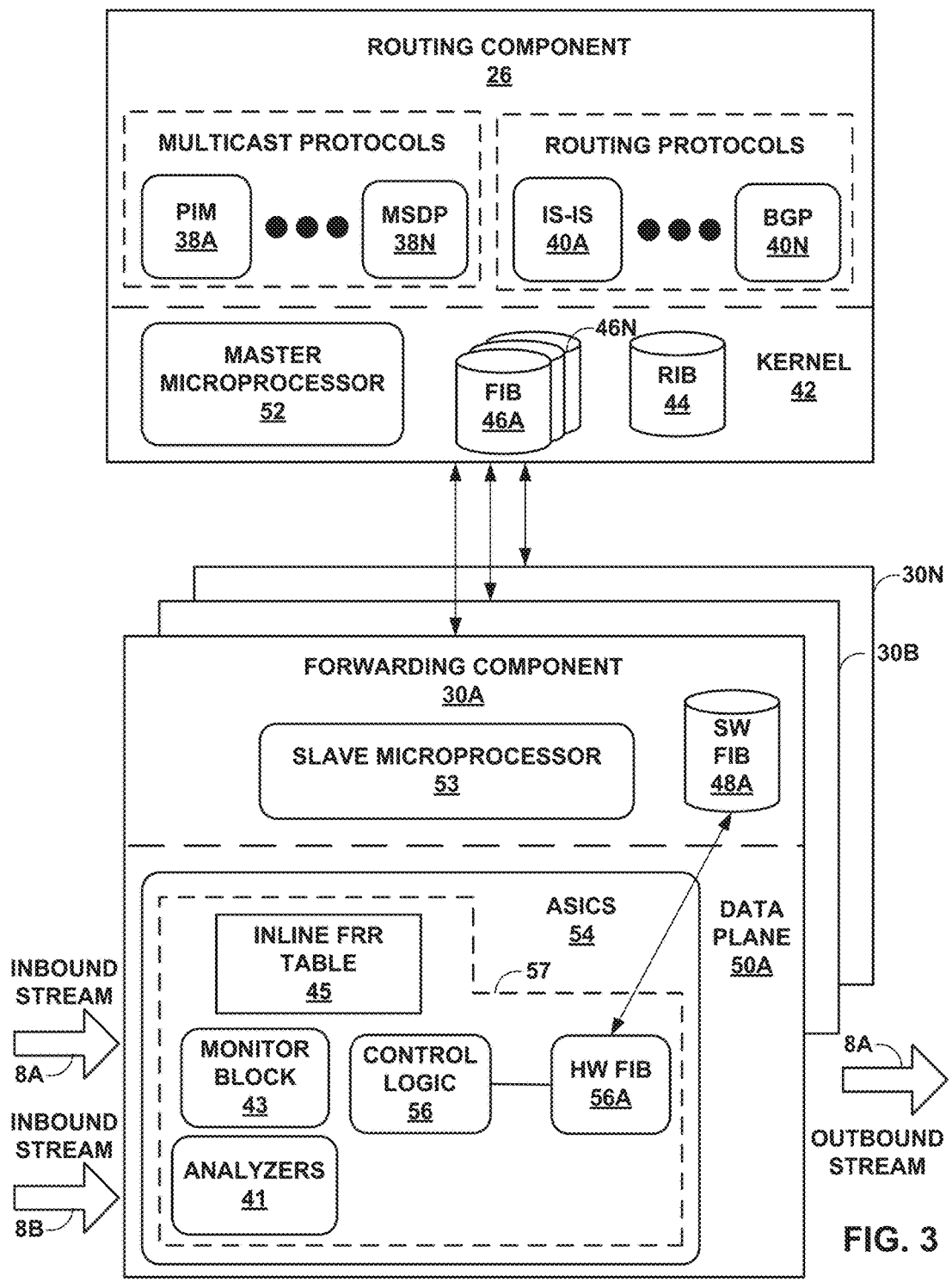
FIG. 3 is a block diagram illustrating a routing component and a forwarding component of the routing device of FIG. 2 in further detail.

FIG. 3 is a block diagram illustrating a routing component and a forwarding component of the routing device 20 of FIG. 2 in further detail. Routing device 20 may be a router such as any of routers 12 of FIG. 1. For example, routing device 20 may be a topology merge point router that can apply multicast fast reroute techniques. Routing device 20 can implement fast failover from forwarding a primary redundant multicast stream to forwarding a secondary redundant multicast stream using the techniques of this disclosure.

Routing component 26 may include various protocols 38A-38N, such as Protocol Independent Multicast (PIM) 38A and multicast source discovery protocol (MSDP) 38N. In some examples, routing device 20 may include only one of PIM 38A and MSDP 38N, or may not include either. PIM 38A and MSDP 38N may be used in establishing a primary multicast forwarding path 17A and a secondary multicast forwarding path 17B between network device 12A and network device 12F within network 14. For example, routing device 20 may use PIM 38A to output multicast join requests along two or more disjoint multicast forwarding paths toward network device 12A to establish a plurality of multicast forwarding paths, including primary multicast forwarding path 17A and secondary multicast forwarding path 17B (FIG. 1). In other examples, routing device 20 may use a different protocol for establishing multicast forwarding paths for redundant multicast streams, such as mLDP.

Routing component 26 also includes high-level, control plane routing protocols 40A-40N ("routing protocols 40"). In the example of FIG. 3, routing protocols 40 include Intermediate System to Intermediate System (IS-IS) 40A and Border Gateway Protocol (BGP) 40N. Routing component 26 may include other protocols and additional routing protocols not shown in FIG. 3. Routing protocols 40 interact with kernel 42 (e.g., by way of API calls) to update routing information base (RIB) 44 based on routing protocol messages received by routing device 20. In response, master microprocessor 52 of kernel 42 generates forwarding information in the form of FIBs 46A-46N based on the network topology represented in RIB 44, i.e., performs route resolution. For example, master microprocessor 52 may determine the physical interface port to be used for forwarding packets to the forwarding next hops. Master microprocessor 52 of kernel 42 then programs forwarding components 30 to install copies of the FIBs as software FIBs 48A-48N.

In this example, ASICs 54 are microcode-controlled chipsets programmably configured by a slave microprocessor 53 executing on each of forwarding components 30A-30N (e.g., forwarding component 30A). Specifically, one or more of ASICs 54 is controllable by microcode 57 programmed by slave microprocessor 53. The slave microprocessor 53 programs a hardware FIB 56A into internal memory of ASICs 54 within the data plane 50A based on software FIB 48A. When forwarding packets, control logic 56 traverses HW FIB 56A and, upon reaching a FIB entry for the packet (e.g., a leaf node), forwarding ASICs 54 automatically forward to forwarding next hop(s) of the entry a single stream from among two or more redundant multicast packet streams. ASICs 54 of forwarding component 30A discard the other redundant multicast streams. In this manner, only one of the redundant multicast streams is forwarded by forwarding component 30A. The interaction between slave microprocessor 53, control logic 56, monitor block 43, and HW FIB 56A is described in further detail below with respect to FIGS. 4-8. Additional details regarding forwarding component programming and microcode-controlled ASICs is found in U.S. Pat. No. 8,806,058, issued Aug. 12, 2014, the entire content of which is incorporated by reference herein.

After the ASICs 54 are programmed with HW FIBs 56A-56N (HW FIBs 56B-56N not shown), data planes 50A-50N of routing device 20 may receive inbound traffic including redundant multicast streams received on different incoming interfaces associated with different redundant multicast streams. For example, routing device 20 may receive redundant packets via two or more interfaces of forwarding component 30A. For each received multicast packet, forwarding component 30A references HW FIB 56A using header information of the packet as a key to obtain forwarding next hop(s) for the packet (e.g., an outgoing interface list), and does an RPF check of the interface on which the packet was received, to determine whether to forward the packet out one or more outgoing interfaces associated with a corresponding forwarding next hop. Control logic 56 may do the RPF check, for example.

As noted above, a routing device 20 that is configured for multicast fast-reroute would receive multiple streams that are duplicated in the network; routing device 20 forwards one of the streams to downstream receivers. In one example, the selection is based on an enhanced RPF check, to check for incoming interface and/or incoming label, and to determine whether the stream is active (i.e., to be forwarded) or backup (i.e., to be dropped). The active stream is monitored and forwarded and all the backup streams are monitored and dropped. A similar process is followed for tunnels. In some examples, streams and tunnels default to a designated primary stream or tunnel being the active stream or tunnel, while designated redundant streams and tunnels default to backups.

To implement multicast fast reroute, the RPF next-hop is enhanced to a list of RPF elements, where each element qualifies one of the redundant streams/tunnels. The RPF element is enhanced to identify the sender in MVPN deployments, and depending on the application, it can be, for example, any of the following:

1. Incoming interface—IP Multicast
2. Incoming label—MLDP
3. Incoming interface and Provider-tunnel label—Next Gen MVPNs
4. Incoming interface and Source-IP address—Rosen MVPNs Depending upon the deployment, multicast streams are monitored collectively or singly, per (S,G). This monitor element is given an identifier called Session-id. The session-id uniquely determines the entity that is being monitored and glues the fast-reroute mechanism across the system. When a single stream reroute is desired, a session-id is assigned per (S,G). In Multicast VPNs that use inclusive tunnels, several streams are sent via a single provider tunnel across the core, a session-id is assigned per tunnel, thus collectively monitoring all streams that flow in the tunnel. In one example, the session-id for each tunnel is read from the tunnel label. In one MVPN example, these are single-labeled tunnels.

In one example, the RPF next-hop is a list of RPF elements. The list includes stream weight, where the stream weight represents the primary/backup status of the stream(s) and the session-id represents the monitored entity. In one example, a stream weight of '1' indicates the stream is a primary stream while a stream weight of, for example, 'FFFF' indicates that the stream is a backup stream. For each session-id within an RPF element, an instance of monitor block 43 is created which includes a counter and two action next-hops: active/forward-nh and backup/drop-nh; each session counter counts the bytes of all the (S,G)s with the same session ID. In one such example, a block 43 instance is hooked to the corresponding RPF element, so as to achieve many-to-one mapping between multiple streams (S,G)s and a single monitor block 43.

In the multicast context, for example, forwarding component 30A may use a source IP address as the key for referencing HW FIB 56A. Based on HW FIB 56A, ASICs 54 will perform RPF checks using the RPF interface specified by the element of the RPF list corresponding to the key, and automatically forward or drop the packet based on the RPF check.

Analyzers 41 include one or more analyzers, each associated with a different incoming logical interface on which an inbound packet stream is received. Analyzers 41 are blocks programmed into a portion of ASICs 54, and may be programmed with an associated data transfer rate (such as bits/s or bytes/s). In some example approaches, analyzers 41 analyze the quality of incoming streams relative to the programmed rate, and record the quality of incoming streams to inline FRR table 45. In some such example approaches In some examples, analyzers 41 may include byte counters used to determine the byte rate of each stream. If the data stream has a data transfer rate below a configured threshold rate, analyzer 41 deems the stream to be of bad quality.

In the example shown in FIG. 3, inline FRR table 45 tracks the quality and status of all the multicast streams or tunnels. In one example, a session identifier (session ID) is assigned to each stream, and this ID is used to index into table 45. In one such example, each table section includes a counter address, an expected bytes entry and a detect interval. A thread executing in forwarding component 30 determines, based on the counter address, the expected bytes entry and the detect interval whether the stream is at or above the desired data transfer rate threshold. The thread also stores a current counter value for each session ID to the appropriate counter address.

In one example, monitor block 43 has read access to Inline FRR table 45. Although described for purposes of example as a table, inline FRR table 45 may be stored in the form of one or more tables, databases, link lists, radix trees, databases, flat files, or any other data structures. In one example, the byte counters aggregate the flows through each tunnel.

In the example shown in FIG. 3, analyzer block 41 monitors the status of incoming redundant multicast streams, and programs FRR session arguments in table 45 to reflect the redundant multicast streams that have a data transfer rate above a configured threshold. If more than one of a plurality of redundant multicast streams is above the configured threshold, analyzer block 41 may be configured to default to selecting the primary multicast stream to forward. Analyzer block 41 and monitor block 43 may be one or more hardware threads of ASICs 54.

Analyzer block 41 monitors the counter information associated with particular session IDs in inline FRR table 45 and, upon detecting that quality of a primary data stream has fallen below the configured rate threshold, analyzer block 41 dynamically rewrites the next hop operations to forward instead a different data stream having good quality. This way when the session counter drops below that expected in view of the expected bytes entry, the change will be made, and a new stream may be picked up for forwarding. As a result, when a packet comes in on the primary stream, ASICs 54 do a look up based on the packet header, and now select a different higher quality data stream.

For example, if multiple streams are being received, ASICs 54 forward only the good quality stream, while dropping the other streams. The stream that survives will be forwarded to the OIF list of the route. When analyzer block 41 detects that the quality of the current stream falls below a threshold, analyzer block 41 dynamically rewrites the next hop operations; this causes another stream to be picked. Stream switchover is almost instantaneous, as updates are done in the dataplane. Since analyzer block 41 and stream switchover are implemented in ASICs 54, the detection and switchover times can be in the order of milliseconds, and less than 50 milliseconds.

Reverse path forwarding (RPF) checks are enabled by the data plane 50A of routing device 20. In accordance with the techniques of this disclosure, the identity of the RPF interface can be used for triggering the data plane 50A to switch to forwarding the secondary redundant multicast stream upon detecting failures or congestion along the primary multicast forwarding path. Upon detecting a failure or congestion of a network resource on the primary multicast forwarding path, such as by using a hardware thread such as analyzer blocks 41 as described above, the hardware thread may dynamically rewrite the next hop operations to select instead the secondary multicast forwarding path. As one example, upon determining that a packet has a hardware thread executing in microprocessor 53 dynamically rewrites the next hop operations to forward the higher quality secondary stream instead. Thus, multicast packets received on the secondary multicast forwarding path will be accepted and forwarded as being received on the RPF interface, and multicast packets received on any other multicast forwarding path will be dropped as not being received on the RPF interface. The outgoing interface list may stay the same. Routing device 20 terminates the multicast live-live forwarding by selecting a single redundant stream to forward and discarding packets received on the other redundant stream(s).

In one example, multicast streams may ingress the router into forwarding components 30, or into a single forwarding component 30. In some examples, a multicast stream received on one forwarding component is forwarded to another forwarding component before being processed.

Figure 4:
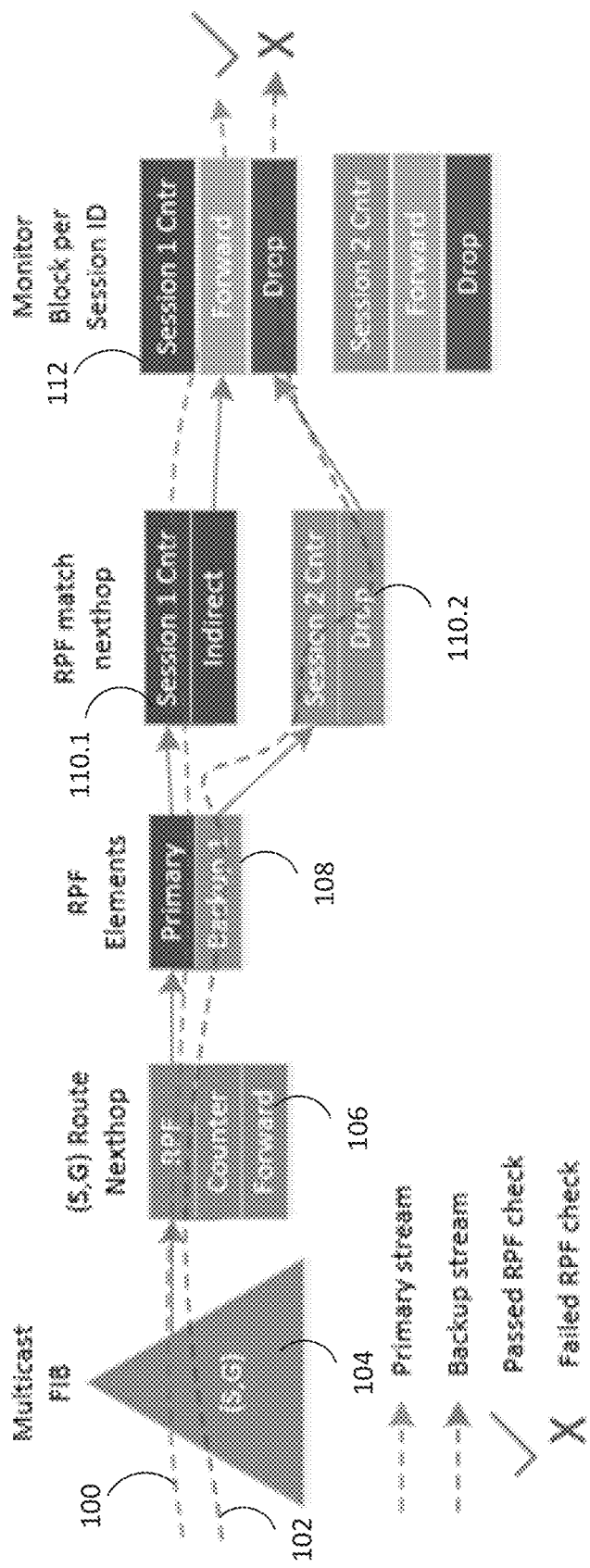
FIG. 4 illustrates multicast live-live stream forwarding in a single forwarding component 30.
Figure 5:
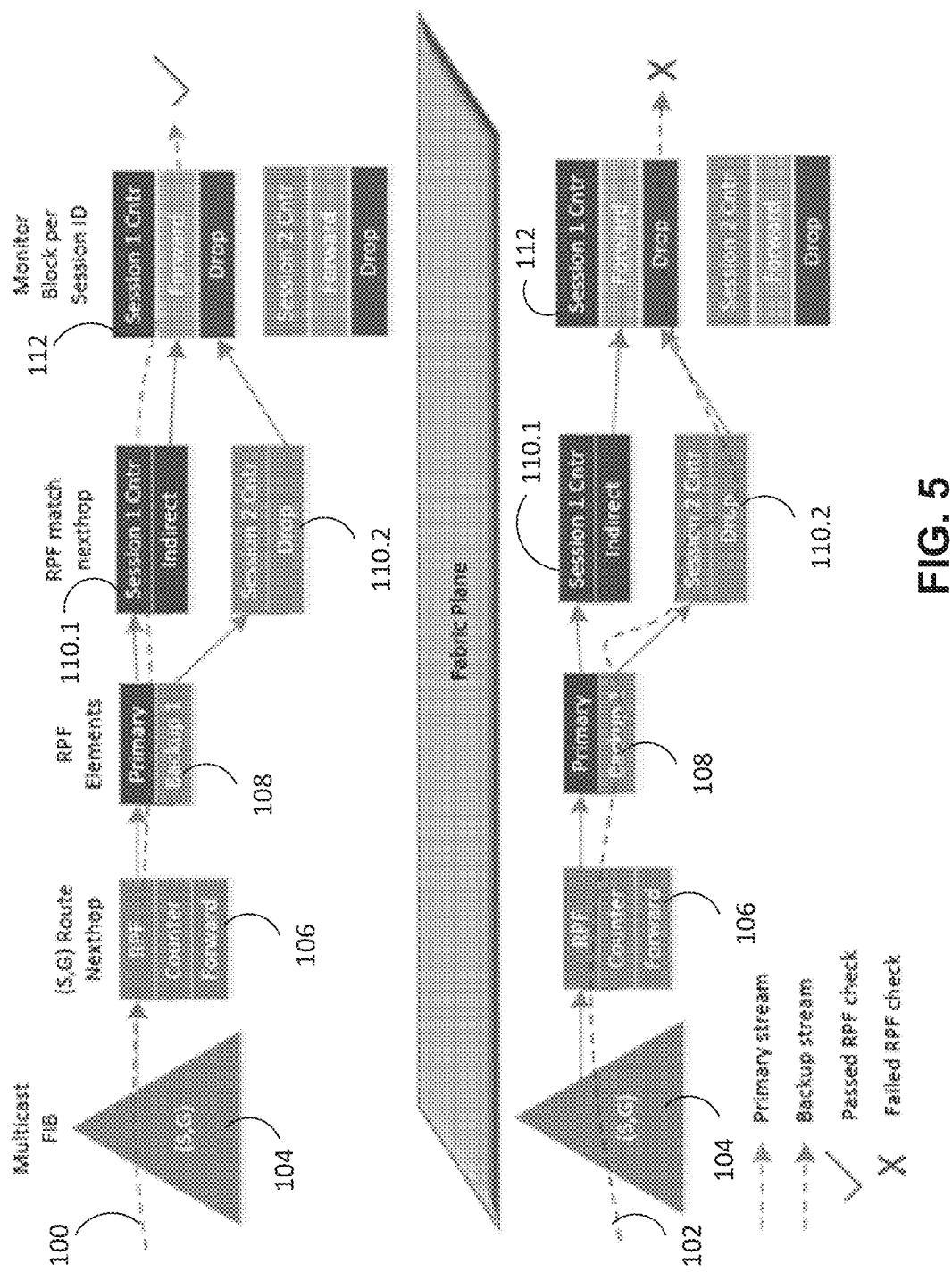
FIG. 5 illustrates multicast live-live forwarding in a distributed model.

FIG. 4 demonstrates multicast live-live streams in a single forwarding component 30 and FIG. 5 shows the forwarding in a distributed model. In the example shown in FIG. 4, a primary stream 100 and a backup stream 102 are received by forwarding component 30. When a multicast packet is received, after the (S,G) route lookup, an RPF check is done which identifies whether the stream is an active stream or a backup stream. If the stream is active, the RPF next-hop counts the packet bytes and forwards the packet. If the stream is a backup, the corresponding RPF next-hop counts the packet bytes and drops the packet. In the example of FIG. 4, a route node of hardware FIB 56A reviews the session ID of each stream at 104, performs an RPF check at 106 and determines the primary stream at 108. A counter associated with each session ID is incremented at 110 as a function of packet size. The primary packet is forwarded at 112 and the remaining redundant streams are discarded. Although only a single backup stream is shown in FIG. 4, routing device 20 is capable of handling as many backup streams as needed. In one multiple backup stream approach, each stream is assigned a session ID and the session ID is used to establish and monitor status stored as a function of session ID in inline FRR table 45.

In the example shown in FIG. 5, a primary stream 100 is received by one forwarding component 30 while a backup stream is received by a second forwarding component 30. When a multicast packet is received, after the (S,G) route lookup, an RPF check is done which identifies whether the stream is an active stream or a backup stream. If the stream is active, the RPF next-hop counts the packet bytes and forwards the packet. If the stream is a backup, the corresponding RPF next-hop counts the packet bytes and drops the packet. In the example of FIG. 5, a route node of the hardware FIB 56 associated with each forwarding component 30 reviews the session ID of its associated stream at 104, performs an RPF check at 106 and determines the primary stream at 108. A counter associated with each session ID is incremented at 110 as a function of packet size. The primary packet is forwarded at 112 and the remaining redundant streams are discarded. In one such example, the slave microprocessor 53 for each forwarding component 30 shares its FRR status with the other forwarding components being used to route the redundant streams.

In one example, upon receiving a multicast packet at routing device 20 to be forwarded, control logic 56 accesses HW FIB 56A and traverses the tree of HW FIB 56A to arrive at a leaf node using the source IP address of the multicast packet as a key. Control logic 56 reads the RPF interface selected and performs an RPF check to see whether the incoming interface of the multicast packet matches the specified RPF interface. If the RPF check passes, control logic 56 directs ASICs 54 to forward the received multicast packet to the outgoing interfaces specified by the OIF list. Such an approach is described in U.S. Pat. No. 8,837,479, entitled "Fast Reroute between Redundant Multicast Streams," the description of which is incorporated herein by reference.

In one example, when a multicast packet is received, after the (S,G) route lookup, the RPF check is done which identifies whether the stream is an active stream or a backup stream. If the stream is active, the RPF next-hop counts the packet bytes and forwards the packet. If the stream is a backup, the corresponding RPF next-hop counts the packet bytes and drops the packet.

For a given RPF list, all the elements point to the active session's forwarding next-hops; the active stream points to the forward-nh and all the backup streams of the RPF list point to the drop-nh that belong to the active session. With this separation of action next-hops, we can achieve high scale fast-reroute of several thousand streams that share the same session-id, with a single operation.

In one example, for each session-id there is a corresponding inline FRR session entry in the hardware (e.g., in Inline FRR table 45), which is serviced by hardware callout threads that get ticked periodically (e.g., every 2 milliseconds). In one such example, the user configured threshold rate is converted into an 'expected-byte' value for a pre-determined 'detect-interval' for each stream or tunnel using this formula:

$$\text{Minimum bytes expected per detect interval: Bytes-per-second}=(\text{rate-kbps}*1000)/8$$

$$\text{Bytes-per-interval}=(\text{Bytes-per-second}*\text{detect-interval-ms})/1000=(\text{rate-kbps}*\text{detect-interval-ms})/8$$

where rate-kbps is a user specified threshold for the session-id in kilo-bits-per-second units. In one example, to achieve sub-50 ms convergence, the detect interval may be set to a value of 10 ms. In one such example, the expected-byte value may be adjusted by a certain amount to account of traffic jitter and variable packet sizes in order to prevent false positive session state changes.

In one such example, each counter entry in inline FRR table 45 is cleared periodically (e.g., every 10 milliseconds). In one example, the two periods are programmable by the user.

Figure 6:
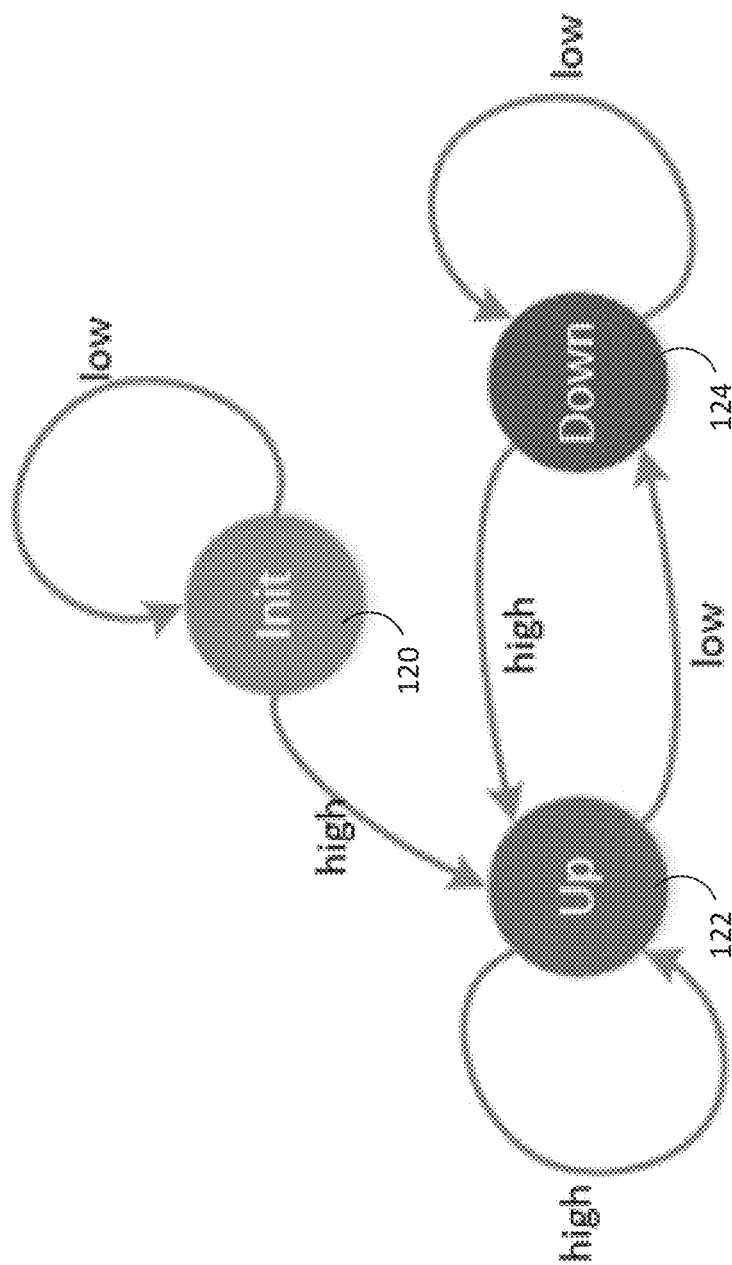
FIG. 6 illustrates a state machine associated with each session.

A method of monitoring stream or tunnel quality is shown in FIG. 6. In the example shown in FIG. 6, for each FRR session, the callout thread monitors the session's counter to ensure that the rate of the stream(s) corresponding to the session is above the expected-bytes. At cold-start, a session's status is set to 'init' (state 120). At the end of the detect-interval, the callout reads the counter for accumulated bytes; if the accumulated bytes exceed the expected-bytes, the session's status is set to 'up' (state 122). If the accumulated bytes value is less than the expected-bytes, the session's status is set to 'down' (state 124).

In one example, a session ID that had previously been designated as primary falls below the expected data transfer rate and transitions from state 122 to state 124. Its packets are subsequently discarded. If, however, stream quality as indicated by bit rate passes above the data transfer rate threshold, the session state transitions from state 124 to state 122, and the packets associated with the session are once again forwarded. In another example, a session ID that had previously been designated as primary falls below the expected byte rate and transitions from state 122 to state 124. Its packets are subsequently discarded. If, however, stream quality as indicated by a number of expected bytes over a time period passes above the byte rate threshold, the session state transitions from state 124 to state 122, and the packets associated with the session are once again forwarded.

Figure 7:
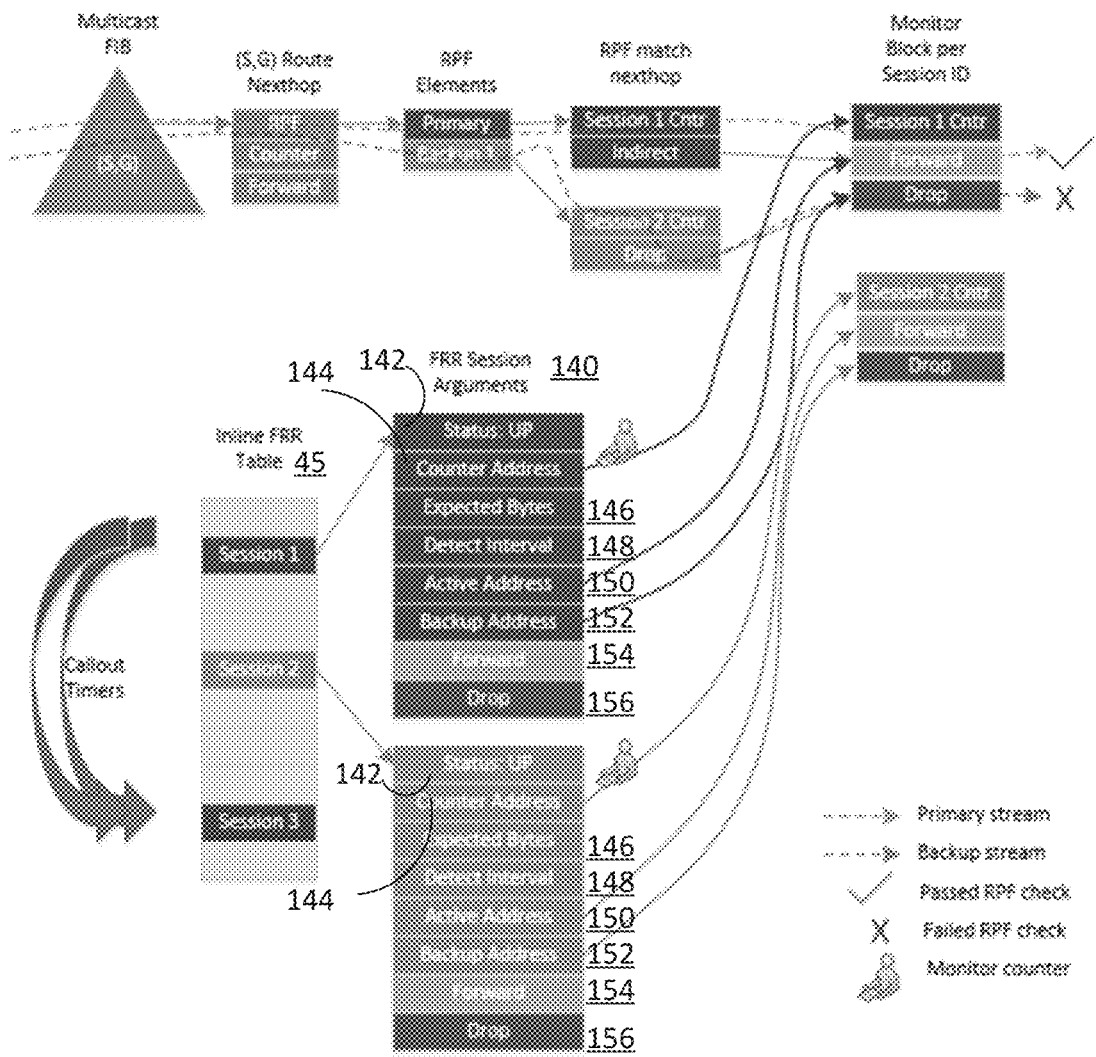
FIGS. 7 and 8 illustrate Fast Re-route (FRR) arguments associated with a primary stream and a backup stream in an FRR status table.

In one example, as is shown in FIG. 7, each FRR session is programmed with FRR arguments 140 stored in inline FRR table 45. In the example shown in FIG. 7, each of the active and backup streams is above the bit rate threshold. Therefore, their status (status 142) is "UP". The current byte count for each session is shown in counter address location 144, while the expected bytes value and the detect interval are shown in expected byte location 146 and detected interval location 148, respectively.

To achieve fast-reroute in hardware, when a session's status changes from 'up' to 'down', the micro-code writes a 'forward-nh' 154 at the session's backup-action-nh-address 152 and a 'drop-nh' 156 at the session's active-action-nh-address 150. With these two write operations, we are able to achieve fast-reroute in just a few milliseconds after detection.

When a session's status changes from 'down' to 'up', the micro-code writes a 'forward-nh' 154 at the session's active-action-nh-address 150 and a 'drop-nh' 156 at the session's backup-action-nh-address 152. In some examples, this operation is applicable to transient scenarios where a downed session exists in hardware before the control plane realizes and reprograms the RPF nexthops to exclude the corresponding elements and thereby deleting the session from the FRR tables.

Figure 8:
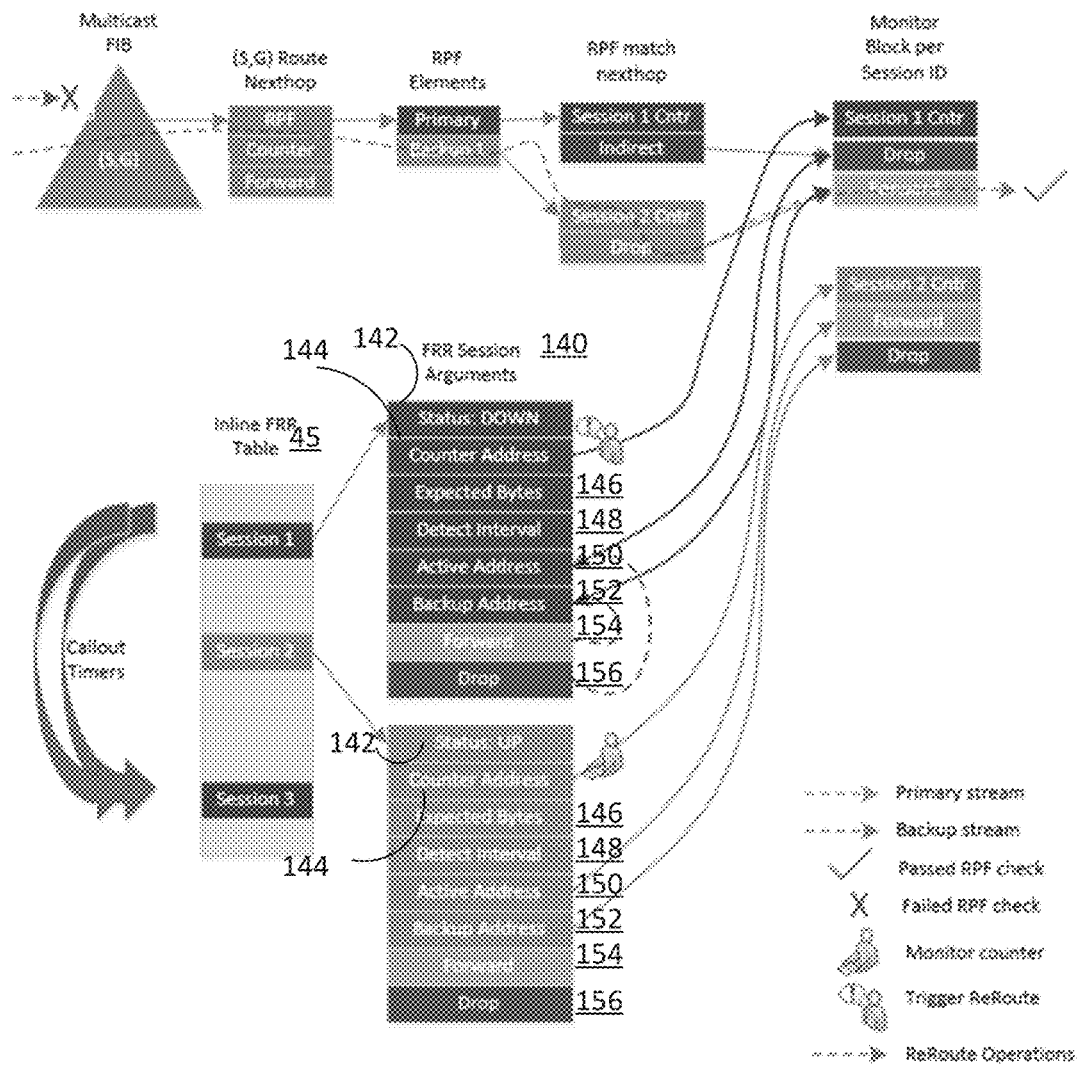

FIG. 8 shows the repair process and the state of the streams after an active stream's session status changes from 'up' to 'down', and fast-reroute is achieved as detailed above. A more detailed example of monitoring and repair for a given session is shown in the microcode below (the state represents the state of a session in the session table):

```
//////////////////
//
// FRR ucode.
//
// In the callout thread, for each FRR session do:
//
// Check the counter to see if the rate is above or below threshold.
//
// If counter value < min_bytes
//
// if (previous_state == init) {
// do nothing, remain in init state
//}
//
// if (previous_state == down) {
// do nothing, remain in down state
//}
//
// if (previous_state == up) {
// set frr_dw1.current_state = down;
// increment frr_dw1.num_state_changes;
//
// if (frr_dw2.backup_vaddr_valid) {
// write frr_dw3.forward_jnh @ frr_dw2.backup_vaddr;
//}
// if (frr_dw2.active_vaddr_valid) {
// write frr_dw4.rpf_drop_jnh @ frr_dw2.active_vaddr;
//}
//
// frr_dw1.notify_interval_curr--;
//
// // send notification if state changed for the very
// // first time or if current running count becomes zero
// if (frr_dw1.notify_interval_curr == 0) {
// send a notification to host;
//
// // double the wait time and reset running count
// frr_dw1.notify_interval *=2;
// frr_dw1.notify_interval_curr = frr_dw1.notify_interval;
//}
//}
//
// If counter value >=min_bytes
//
// if (previous_state == up) {
// do nothing; // remain in up state
//}
//
// if (previous_state == init || previous_state == down) {
//
// if (frr_dw1.up_count_curr != 0) {
// frr_dw1.up_count_curr--;
// goto done;
//}
//
// // reset up_count_curr and continue to transition to up state
// frr_dw1.up_count_curr = r_ka_args_frr_dw0.up_count;
//
// // goto up state
// frr_dw1.current_state = up;
// increment frr_dw1.num_state_changes;
//
// if (frr_dw2.backup_vaddr_valid) {
// write frr_dw4.rpf_drop_jnh @ frr_dw2.backup_vaddr;
//}
// if (frr_dw2.active_vaddr_valid) {
// write frr_dw3.forward_jnh @ frr_dw2.active_vaddr;
//}
//
// frr_dw1.notify_interval_curr--;
//
// // send notification if state changed for the very
// // first time or if current running count becomes zero
// if (frr_dw1.notify_interval_curr == 0) {
// send a notification to host;
//
// // double the wait time and reset running count
// frr_dw1.notify_interval *=2;
// frr_dw1.notify_interval_curr = frr_dw1.notify_interval;
//}
//}
//
//////////////////
```

In one example, the microcode is stored in each forwarding component 30 and operates on the packet flows for each session in accordance with the state machine. In one example implementation of the microcode given above, forwarding ASIC 54 sends the appropriate notification to slave microprocessor 53 as detailed above.

Figure 9:
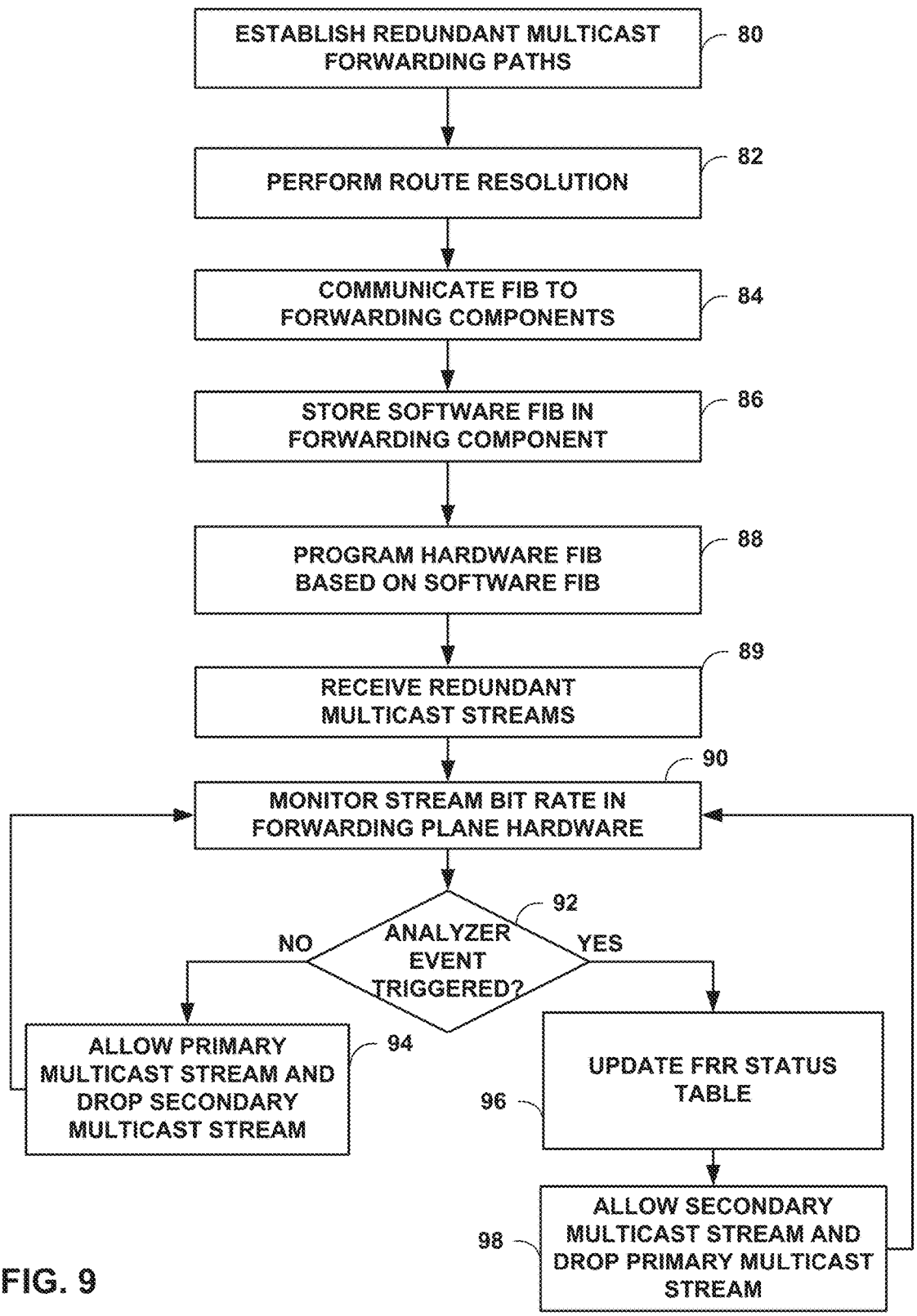
FIG. 9 is a flowchart illustrating example operation of a network device consistent with the techniques described in this disclosure.

FIG. 9 is a flowchart illustrating example operation of a network device such as network device 12F of FIG. 1 or routing device 20 of FIG. 2 consistent with the techniques described in this disclosure. FIG. 9 will be described with reference to FIGS. 1-3. In operation, network device 12F participates in establishing a plurality of redundant multicast forwarding paths within network 14 (80). For example, PIM 38A or MSDP 38N may be used in establishing a primary multicast forwarding path 17A and a secondary multicast forwarding path 17B between network device 12A and network device 12F within network 14.

Routing protocols 40 interact with kernel 42 to update routing information base (RIB) 44 based on routing protocol messages received by routing device 20. In response, master microprocessor 52 of kernel 42 performs route resolution to generate forwarding information in the form of FIBs 46A-46N based on the network topology represented in RIB 44 (82). For example, master microprocessor 52 may determine a physical interface port to be used for outputting packets to the forwarding next hops. Master microprocessor 52 of kernel 42 communicates the FIB to forwarding components 30 (84) by programming the slave microprocessors 53 of forwarding components 30 to install copies of the FIBs as software FIBs 48A-48N (86). A slave microprocessor 53 on each of forwarding components 30A-30N (e.g., forwarding component 30A) programs a hardware FIB 56A of ASICs 54 within the data plane 50A based on software FIB 48A (88).

During operation of the network device, the network device receives a primary multicast stream along the primary multicast forwarding path, and a secondary multicast stream along the secondary multicast forwarding path. The received multicast streams are redundant multicast streams (89). A thread executing within slave microprocessor 53 on each of the forwarding components 30 monitors the quality of the redundant multicast streams in forwarding plane hardware using analyzers for incoming interfaces associated with each interface of its forwarding component 30 (90). When no analyzer event is triggered (NO branch of 92), the active address 150 for that link remains set at its current action next-hop state. The forwarding component forwards the packet stream received on the primary incoming interface to the indicated next hops, and discards redundant packet streams received for that route on the secondary incoming interface (94). When the thread executing within slave microprocessor 53 detects, based on the hardware-based analyzers 41, that a health of an incoming packet stream has dropped below a threshold level (YES branch of 92), the thread modifies a session entry in inline FRR table 45 associated with the incoming packet stream to reflect that a secondary redundant packet stream has superior health and should be forwarded instead (96). This automatically causes the forwarding ASICs 54 to drop subsequent packets received on the primary stream, and causes the forwarding ASICs 54 to forward packets received on the secondary redundant stream (98). Thus, only a single operation in the data plane hardware is needed in order to carry out multicast fast reroute. Moreover, the multicast fast reroute operation does not need control plane signaling to entirely rewrite hardware FIB entries for this operation. This allows for a faster reroute and more scalability. When the health of the primary multicast stream improves, slave microprocessor 53 may again rewrite the next hop operations to reflect the changed status.

Distributed monitoring will be discussed next.

If the upstream interface is an Aggregated Ethernet (AE) interface or an Integrated-Route-Bridge (IRB) interface, the rate of a session needs to be accounted across all forwarding components 30 where the child or member links are hosted. To implement this, in one example, each session is associated with an anchor forwarding component 30 which aggregates the counters from all other member forwarding components 30. An FRR status table session entry 160 to accomplish this is shown in FIG. 10.

Figure 10:
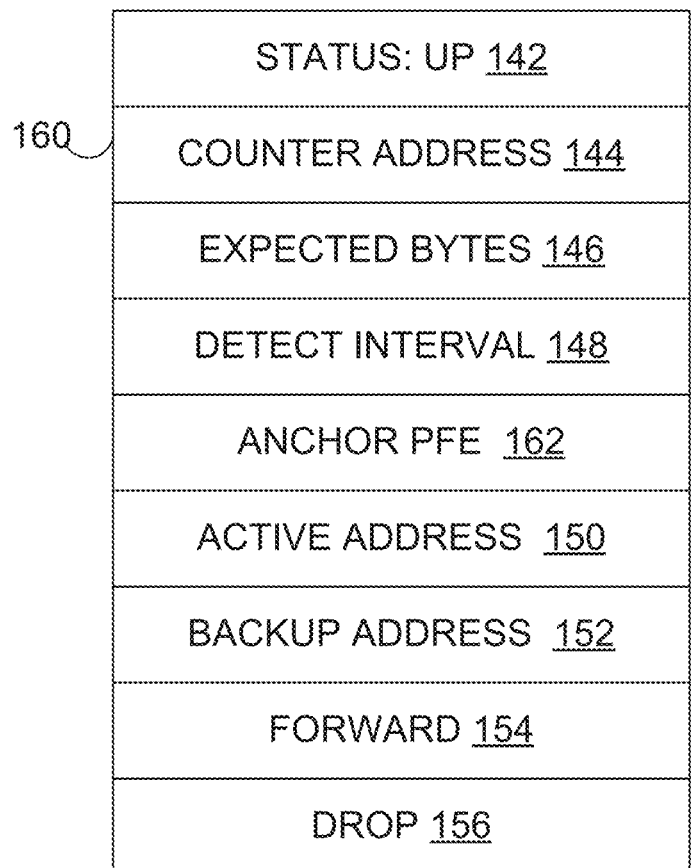
FIG. 10 illustrates Fast Re-route (FRR) arguments associated with a primary stream and a backup stream in an FRR status table when streams are distributed across multiple forwarding components.

The FRR status table session entry 160 shown in FIG. 10 includes the arguments shown in FIGS. 7 and 8. In addition, however, in this example, FRR session entry 160 further includes an anchor PFE entry 162 corresponding to its anchor forwarding component 30. At each tick, the callout on the non-anchor forwarding component 30 reads the session's counter; if the accumulated byte count is non-zero, the non-anchor forwarding component 30 sends a command packet to the anchor forwarding component 30 to increment the session's counter by the byte-count. The anchor-forwarding component 30 reads the commands from all the member forwarding components 30 and increments the counter for the session. In one such example, FRR session monitoring is enabled on the anchor forwarding component 30 and disabled on all other member forwarding components 30, hence the state of the session remains in 'init' on member forwarding components 30 and the state is 'up' or 'down' on the anchor-forwarding component 30. The rest of the processing is the same as on single forwarding component 30.

With regard to repair of a distributed session, when a session's status changes, the callout may send a notification to all forwarding components 30 across the chassis to let the session's status be known to all forwarding components 30. In one such example, each forwarding component 30 may repair the session as required in the same manner described above.

The above methods can be used to repair thousands of streams with a single micro-code operation. A distributed rate computation has been described for streams assigned to single PFEs and to streams distributed across two or more PFEs.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

The invention claimed is:

1. A method comprising:
   receiving, with a network device, a primary multicast stream and a secondary multicast stream, wherein the primary multicast stream and the secondary multicast stream are redundant multicast streams received over disjoint multicast forwarding paths;
   applying a hardware-based analyzer in a forwarding plane of the network device to detect when a quality of one of the primary multicast stream or the secondary multicast stream has fallen below a threshold;
   in response to detecting that a quality of one of the primary multicast stream or the secondary multicast stream has fallen below a threshold, selecting, via a thread executing in a forwarding component of the network device, a different one of the primary multicast stream or the secondary multicast stream having a quality that meets the threshold, wherein selecting includes dynamically rewriting next hop operations associated with the selected stream;
   forwarding packets received on the selected one of the primary multicast stream or the secondary multicast stream; and
   discarding packets of the multicast stream received on the other one of the primary multicast stream or the secondary multicast stream for which the quality has fallen below the threshold.

2. The method of claim 1, wherein detecting that a quality of one of the primary multicast stream or the secondary multicast stream has fallen below a threshold includes tracking a data transfer rate associated with both the primary multicast stream and the secondary multicast stream and indicating when the data transfer rate for one or more of the streams falls below a threshold data transfer rate.

3. The method of claim 2, wherein each expected incoming interface comprises a reverse path forwarding (RPF) interface, further comprising:
   upon receiving a packet, performing an RPF interface check as a function of a session identifier associated with the packet.

4. The method of claim 3, wherein the data transfer rate tracked is a bit transfer rate.

5. The method of claim 3, wherein applying the hardware-based analyzer comprises maintaining a byte count associated with each of the redundant streams and determining the data transfer rate as a function of the byte counter for each stream.

6. The method of claim 1, wherein the primary multicast stream and the secondary multicast stream are received from a primary tunnel and a secondary tunnel, respectively.

7. The method of claim 6, wherein the quality of each stream is a function of a quality measurement of its respective tunnel, wherein applying the hardware-based analyzer comprises maintaining a byte count for each stream within a tunnel and determining a quality measurement of each tunnel as a function of the accumulated byte count of the streams within that tunnel.

8. A routing device comprising:
   one or more interface cards having at least one port to send and receive packets; and
   a forwarding component coupled to the interface cards, the forwarding component comprising:
      a packet-forwarding integrated circuit comprising:
         a control logic module; and
         an inline fast re-route table, wherein the inline fast re-route table maintains status associated with each of a plurality of redundant multicast data streams, wherein the status is used to select a redundant multicast data stream from the plurality of redundant multicast data streams to forward to a next routing device and to discard any remaining streams;
      a memory to store a hardware version of a forwarding information base (FIB), the hardware version of the FIB including a plurality of entries addressable by the packet-forwarding integrated circuit, wherein each of the entries is associated with different packet header key data, and identifies one or more forwarding next hops for forwarding data packets matching the respective entry, and wherein each entry identifies an incoming interface for a multicast data stream; and
      a processor, wherein the processor, in response to detecting that a quality of one of the redundant multicast data streams has fallen below the quality threshold, automatically rewrites next hop operations to forward a different redundant multicast data stream to the next routing device.

9. The routing device of claim 8, further comprising:
   wherein the packet-forwarding integrated circuit forwards packets received on a primary multicast stream and discards packets received on a secondary multicast stream when the incoming interface of the routing device on which the primary multicast stream is received is as expected.

10. The routing device of claim 8, wherein detecting that a quality of one of the redundant multicast data streams received on the expected incoming interface has fallen below a quality threshold includes tracking a bit rate associated with each of the redundant multicast data streams and indicating when the bit rate for one or more of the data streams falls below a threshold bit rate.

11. The routing device of claim 8, wherein the control logic module, upon receiving a packet, performs a reverse path forwarding (RPF) check as a function of a session identifier associated with the packet.

12. The routing device of claim 8, wherein entries of the hardware FIB are addressable by the packet-forwarding integrated circuit based on a multicast source address of received packets.

13. The routing device of claim 12, wherein each entry of the hardware version of the FIB identifies a forwarding next hop to which to forward the received packet, wherein the forwarding next hop comprises a list of outgoing interfaces to which to forward received packets.

14. The routing device of claim 8, wherein the primary multicast stream and the secondary multicast stream are received from a primary tunnel and a secondary tunnel, respectively.

15. The routing device of claim 14, wherein the quality of each stream is a function of a quality measurement of each stream's respective tunnel, wherein a hardware-based analyzer accumulates byte counts across each stream within a tunnel and determines a quality measurement of each tunnel as a function of the accumulated byte count for that tunnel.

16. A non-transitory computer-readable storage medium comprising instructions for causing a programmable processor to:
receive a primary multicast stream and a secondary multicast stream, wherein the primary multicast stream and the secondary multicast stream are redundant multicast streams received over disjoint multicast forwarding paths;
apply a hardware-based analyzer in a forwarding plane of the network device to detect when a quality of one of the primary multicast stream or the secondary multicast stream has fallen below a threshold;
in response to detecting that a quality of one of the primary multicast stream or the secondary multicast stream has fallen below a threshold, select, via a thread executing in a forwarding component of the network device, a different one of the primary multicast stream or the secondary multicast stream having a quality that meets the threshold, wherein selecting includes dynamically rewriting next hop operations associated with the selected stream;
forward packets received on the selected one of the primary multicast stream or the secondary multicast stream; and
discard packets of the multicast stream received on the other one of the primary multicast stream or the secondary multicast stream for which the quality has fallen below the threshold.

17. The non-transitory computer-readable storage medium of claim 16, wherein detecting that a quality of one of the primary multicast stream or the secondary multicast stream has fallen below a threshold includes tracking a data transfer rate associated with both the primary multicast stream and the secondary multicast stream and indicating when the data transfer rate for one or more of the streams falls below a threshold data transfer rate.

18. A packet-forwarding integrated circuit comprising:
a hardware-based analyzer to detect when a quality of one of a primary multicast stream and a secondary multicast stream has fallen below a threshold, wherein the primary multicast stream and the secondary multicast stream are redundant multicast streams received over disjoint multicast forwarding paths; and
means for selecting, when a quality of one of the primary multicast stream or the secondary multicast stream has fallen below a threshold, a different one of the primary multicast stream or the secondary multicast stream having a quality that meets the threshold, wherein selecting comprises dynamically rewriting next hop operations associated with the selected stream,
wherein the packet-forwarding integrated circuit forwards packets received on the selected one of the primary multicast stream or the secondary multicast stream, and discards packets of the multicast stream received on the other one of the primary multicast stream or the secondary multicast stream for which the quality has fallen below the threshold.

19. The packet-forwarding integrated circuit of claim 18, wherein the packet-forwarding integrated circuit forwards packets received from the primary multicast stream only when the incoming interface of the routing device on which the primary multicast stream is received is as expected.

20. The packet-forwarding integrated circuit of claim 18, wherein detecting that a quality of one of the redundant multicast data streams received on the expected incoming interface has fallen below a quality threshold includes tracking a bit rate associated with each of the redundant multicast data streams and indicating when the bit rate for one or more of the data streams falls below a threshold bit rate.

21. The packet-forwarding integrated circuit of claim 18, wherein the forwarding component, upon receiving a packet, performs a reverse path forwarding (RPF) check as a function of a session identifier associated with the packet.

22. The packet-forwarding integrated circuit of claim 18, wherein entries of the hardware FIB are addressable by the packet-forwarding integrated circuit based on a multicast source address of received packets.

23. The packet-forwarding integrated circuit of claim 22, wherein each entry of the hardware version of the FIB identifies a forwarding next hop to which to forward the received packet, wherein the forwarding next hop comprises a list of outgoing interfaces to which to forward received packets.

24. The packet-forwarding integrated circuit of claim 18, wherein the analyzer maintains a byte count associated with each of the redundant streams and wherein quality is a function of the byte counter for that stream.

25. The packet-forwarding integrated circuit of claim 18, wherein the primary multicast stream and the secondary multicast stream are received from a primary tunnel and a secondary tunnel, respectively.

26. The packet-forwarding integrated circuit of claim 25, wherein the quality of each stream is a function of a quality measurement of each stream's respective tunnel, wherein applying the analyzer maintains a byte count for each stream within a tunnel and determining a quality measurement of each tunnel as a function of the accumulated byte count for that tunnel.

27. A routing device comprising:
one or more interfaces to receive a primary multicast stream and a secondary multicast stream, wherein the primary multicast stream and the secondary multicast stream are redundant multicast streams received over disjoint multicast forwarding paths; and
a forwarding component connected to the one or more interfaces, wherein the forwarding component comprises:
a general-purpose processor; and
a packet-forwarding integrated circuit comprising a hardware-based analyzer to detect when a quality of one of the primary multicast stream or the secondary multicast stream has fallen below a threshold;
wherein a thread executing in the general-purpose processor detects that a quality of one of the primary multicast stream or the secondary multicast stream has fallen below a threshold and selects a different one of the primary multicast stream or the secondary multicast stream having a quality that meets the threshold, wherein selecting includes dynamically rewriting next hop operations associated with the selected stream; and
wherein the packet-forwarding integrated circuit forwards packets received on the selected one of the primary multicast stream or the secondary multicast stream, and discards packets of the multicast stream received on other ones of the primary multicast stream or the secondary multicast stream.

28. The routing device of claim 27, wherein the packet-forwarding integrated circuit forwards packets received from the primary multicast stream only when the incoming interface of the routing device on which the primary multicast stream is received is as expected.

29. The routing device of claim 28, wherein detecting that a quality of one of the redundant multicast data streams received on the expected incoming interface has fallen below a quality threshold includes tracking a bit rate associated with each of the redundant multicast data streams and indicating when the bit rate for one or more of the data streams falls below a threshold bit rate.

30. The routing device of claim 27, wherein the packet-forwarding integrated circuit, upon receiving a packet, performs a reverse path forwarding (RPF) check as a function of a session identifier associated with the packet.

31. The routing device of claim 30, wherein entries of a hardware FIB are addressable by the packet-forwarding integrated circuit based on a multicast source address of received packets.

32. The routing device of claim 31, wherein each entry of the hardware FIB identifies a forwarding next hop to which to forward the received packet, wherein the forwarding next hop comprises a list of outgoing interfaces to which to forward received packets.

33. The routing device of claim 27, wherein the hardware-based analyzer includes a byte count associated with each of the redundant streams and wherein quality is a function of the byte count for that stream.

34. The routing device of claim 27, wherein the primary multicast stream and the secondary multicast stream are received from a primary tunnel and a secondary tunnel, respectively.

35. The routing device of claim 34, wherein the quality of each stream is a function of a quality measurement of each stream's respective tunnel, wherein applying the hardware-based analyzer comprises accumulating byte counts across each stream within a tunnel and determining a quality measurement of each tunnel as a function of the accumulated byte count for that tunnel.

\* \* \* \* \*